US012619122B2

(12) United States Patent
Kim et al.

(10) Patent No.: US 12,619,122 B2
(45) Date of Patent: May 5, 2026

(54) SPATIAL LIGHT MODULATORS, METHODS OF OPERATING AND MANUFACTURING THE SAME, AND APPARATUS INCLUDING SPATIAL LIGHT MODULATOR

(71) Applicant: SAMSUNG ELECTRONICS CO., LTD., Suwon-si (KR)

(72) Inventors: Sunil Kim, Suwon-si (KR); Minkyung Lee, Suwon-si (KR); Junghyun Park, Suwon-si (KR); Byunggil Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 18/214,721

(22) Filed: Jun. 27, 2023

(65) Prior Publication Data

US 2024/0201557 A1     Jun. 20, 2024

(30) Foreign Application Priority Data

Dec. 19, 2022     (KR) ........................ 10-2022-0178686

(51) Int. Cl.
*G02F 1/29*          (2006.01)

(52) U.S. Cl.
CPC ..................................... *G02F 1/29* (2013.01)

(58) Field of Classification Search
None
See application file for complete search history.

(56) References Cited

U.S. PATENT DOCUMENTS

| 11,209,687 | B2 | 12/2021 | Sakurai | |
| 11,287,516 | B2 | 3/2022 | Kim et al. | |
| 2016/0284474 | A1 | 9/2016 | Saito et al. | |
| 2016/0380405 | A1* | 12/2016 | Takiguchi | H01S 5/187 |
| | | | | 372/26 |
| 2018/0340894 | A1* | 11/2018 | Rim | G01N 21/8806 |
| 2019/0219248 | A1 | 7/2019 | Patent et al. | |
| 2020/0183148 | A1* | 6/2020 | Park | G02B 26/06 |
| 2021/0055626 | A1* | 2/2021 | Jeong | G02F 1/29 |
| 2021/0208256 | A1* | 7/2021 | Kim | G02F 1/292 |
| 2022/0137402 | A1* | 5/2022 | Park | G01S 7/4817 |
| | | | | 359/197.1 |
| 2022/0171027 | A1* | 6/2022 | Kim | H01L 25/167 |
| 2023/0035423 | A1* | 2/2023 | Hirose | H01S 5/185 |
| 2023/0117216 | A1* | 4/2023 | Lee | G02B 26/106 |
| | | | | 359/290 |
| 2023/0123994 | A1* | 4/2023 | Lee | H01S 5/024 |
| | | | | 372/45.01 |
| 2023/0198224 | A1* | 6/2023 | Kurosaka | H01S 3/178 |
| | | | | 372/38.05 |

FOREIGN PATENT DOCUMENTS

KR     10-2013-0087032 A     8/2013

* cited by examiner

*Primary Examiner* — Ryan Crockett
(74) *Attorney, Agent, or Firm* — Sughrue Mion, PLLC

(57) ABSTRACT

A spatial light modulator includes a substrate, a blocking layer provided on one surface of the substrate, a lower reflective layer provided on the blocking layer, an upper reflective layer facing the lower reflective layer, and a cavity layer provided between the upper reflective layer and the lower reflective layer, where the blocking layer includes a plurality of holes configured to block heat transferred from the upper reflective layer to the substrate.

19 Claims, 29 Drawing Sheets

SPATIAL LIGHT MODULATORS, METHODS OF OPERATING AND MANUFACTURING THE SAME, AND APPARATUS INCLUDING SPATIAL LIGHT MODULATOR

CROSS-REFERENCE TO RELATED APPLICATION

This application is based on and claims priority to Korean Patent Application No. 10-2022-0178686, filed on Dec. 19, 2022, in the Korean Intellectual Property Office, the disclosure of which is incorporated by reference herein in its entirety.

BACKGROUND

1. Field

The disclosure relates to optical scanners for radiating incident light in a given direction, and more particularly, to spatial light modulators, methods of operating and manufacturing the same, and apparatuses including the spatial light modulator.

2. Description of Related Art

Spatial light modulators (SLMs) may adjust an emission angle of incident light, and thus may be used as optical scanners. Recently, spatial light modulators using active meta devices have been introduced.

The spatial light modulators using active meta devices may include meta surfaces, distributed Bragg reflectors (DBRs) functioning as mirrors, and cavities.

The meta surfaces of the spatial light modulators may include a plurality of high contrast gratings (HCGs). Both the HCGs and DBRs have high reflectance with respect to incident light, and thus, vertical incident light may be amplified in the cavities and emitted vertically.

When operating spatial light modulators described above, heat may be generated in driving pixels, and the heat may affect the operation of the spatial light modulators.

SUMMARY

Provided are spatial light modulators configured to further increase a thermal cross-talk effect of a driving pixel.

Provided are spatial light modulators configured to operate at low power.

Provided are methods of operating and manufacturing such spatial light modulators.

Provided are apparatuses including spatial light modulators.

Additional aspects will be set forth in part in the description which follows and, in part, will be apparent from the description, or may be learned by practice of the presented embodiments of the disclosure.

According to an aspect of the disclosure, a spatial light modulator may include a substrate, a blocking layer provided on one surface of the substrate, a lower reflective layer provided on the blocking layer, an upper reflective layer facing the lower reflective layer, and a cavity layer provided between the upper reflective layer and the lower reflective layer, where the blocking layer may include a plurality of holes configured to block heat transferred from the upper reflective layer to the substrate.

The spatial light modulator may include a planarization layer provided between the blocking layer and the lower reflective layer.

The plurality of holes may be provided under a top surface of the blocking layer.

The plurality of holes may be of a circular shape.

A first hole of the plurality of holes may have a first diameter, and a second hole of the plurality of holes that is adjacent to the first hole may have a second diameter different from the first diameter.

The plurality of holes may be of a quadrangular shape.

A first hole of the plurality of holes may have a first width and a second hole of the plurality of holes that is adjacent to the first hole may have a second width different from the first width.

The plurality of holes may have diameters varying between top ends of the plurality of holes and bottom ends of the plurality of holes.

The plurality of holes may have maximum diameters between the top ends of the plurality of holes and the bottom ends of the plurality of holes.

The plurality of holes may include a first hole having a first diameter and a second hole having a second diameter different from the first diameter.

A fill factor of the plurality of holes in the blocking layer may be between 5% to 70%.

The plurality of holes may be filled with a material having a thermal conductivity that is lower than a thermal conductivity of a material of the blocking layer.

The thermal conductivity of the material with which the plurality of holes is filled may be lower than a thermal conductivity of $SiO_2$.

The material with which the plurality of holes is filled may include at least one of $HfO_2$, $MoS_2$, polyimide, $Sb_2S_3$, and $Sb_2Se_3$.

The plurality of holes may be filled with air.

The upper reflective layer may include a plurality of pixels spaced apart from each other and wherein each of the plurality of pixels may include a plurality of active meta patterns.

The spatial light modulator may include trenches provided between the plurality of pixels and configured to pass through the cavity layer, the lower reflective layer, and the blocking layer.

Each of the plurality of active meta patterns may include a first layer, a second layer, and a third layer that are sequentially stacked, where the first layer may include one of a P-type dopant and an N-type dopant, where the third layer may include one of a P-type dopant and an N-type dopant, and where the second layer may be thicker than the first layer and the third layer.

The lower reflective layer may include a distributed Bragg reflector (DBR) layer, the DBR layer may include a plurality of first layers including a first thermal conductivity and a plurality of second layers including a second thermal conductivity that is higher than the first thermal conductivity, and where the plurality of first layers and the plurality of second layers may be alternately stacked.

According to an aspect of the disclosure, an electronic apparatus may include a spatial light modulator configured to radiate incident light in a given direction, where the spatial light modulator may include a substrate, a blocking layer provided on one surface of the substrate, a lower reflective layer provided on the blocking layer, an upper reflective layer facing the lower reflective layer, and a cavity layer provided between the upper reflective layer and the lower reflective layer, where the blocking layer may include a plurality of holes configured to block heat transferred from the upper reflective layer to the substrate.

According to an aspect of the disclosure, a method of manufacturing a spatial light modulator may include forming a blocking layer on a surface of a substrate, forming a plurality of holes through the blocking layer, forming a first reflective layer on the blocking layer and covering the plurality of holes, forming a cavity layer on the first reflective layer, and forming a meta surface layer on the cavity layer, where the plurality of holes may be configured to block heat transferred from the meta surface layer to the substrate.

The first reflective layer may include a DBR layer.

The DBR layer may include a plurality of first layers including a first thermal conductivity and a plurality of second layers comprising a second thermal conductivity that is higher than the first thermal conductivity, and the plurality of first layers and the plurality of second layers may be alternately stacked.

The meta surface layer may include a pixel layer.

The pixel layer may include a plurality of active high contrast gratings (HCGs) spaced apart from each other.

The plurality of active HCGs may each have a width that is less than a separation distance between adjacent active HCGs of the plurality of active HCGs.

The method may include forming a transparent material layer on the cavity layer and covering the plurality of active HCGs.

The plurality of active HCGs may include a first group of active HCGs and a second group of active HCGs and the method further may include forming a trench between the first group of active HCGs and the second group of active HCGs.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a cross-sectional view illustrating a first spatial light modulator according to an example embodiment;

FIG. 4 is a cross-sectional view illustrating a second spatial light modulator according to an example embodiment;

FIG. 7 is a cross-sectional view illustrating a third spatial light modulator according to an example embodiment;

FIG. 8 is a cross-sectional view illustrating a fourth spatial light modulator according to an example embodiment;

FIG. 13 is a cross-sectional view illustrating a second spatial light modulator including holes filled with a material having low thermal conductivity according to an example embodiment;

FIG. 15 is a cross-sectional view illustrating a first operating method of a spatial light modulator, according to an example embodiment according to an example embodiment;

FIG. 16 is a cross-sectional view illustrating a second operating method of a spatial light modulator, according to an example embodiment according to an example embodiment;

FIGS. 21, 22, 23, 24, 25, 26, 27 and 28 are cross-sectional views illustrating a method of manufacturing a spatial light modulator, according to an example embodiment.

DETAILED DESCRIPTION

Figure 2:
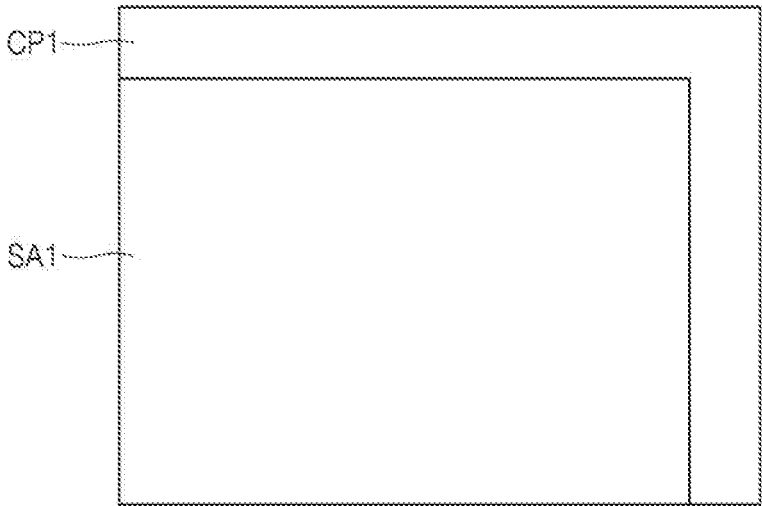
FIG. 2 is a diagram illustrating an example in which a circuit provided on a substrate in the first spatial light modulator of FIG. 1 is provided in a peripheral circuit unit in a region in which spatial light modulation occurs, according to an example embodiment.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a spatial light modulator, methods of operating and manufacturing the spatial light modulator, and an apparatus including the spatial light modulator, according to example embodiments, will be described in detail with reference to the accompanying drawings. In the following description, the thickness of layers or regions illustrated in the drawings may be somewhat exaggerated for clarity of the description. Also, embodiments described below are merely illustrative, and various modifications may be made from the embodiments. In addition, in a layered structure described below, the expression "above" or "on" may include not only those being on in contact with each other but also those being above in non-contact with each other. Like reference numerals in the drawings denote like elements.

Figure 1:
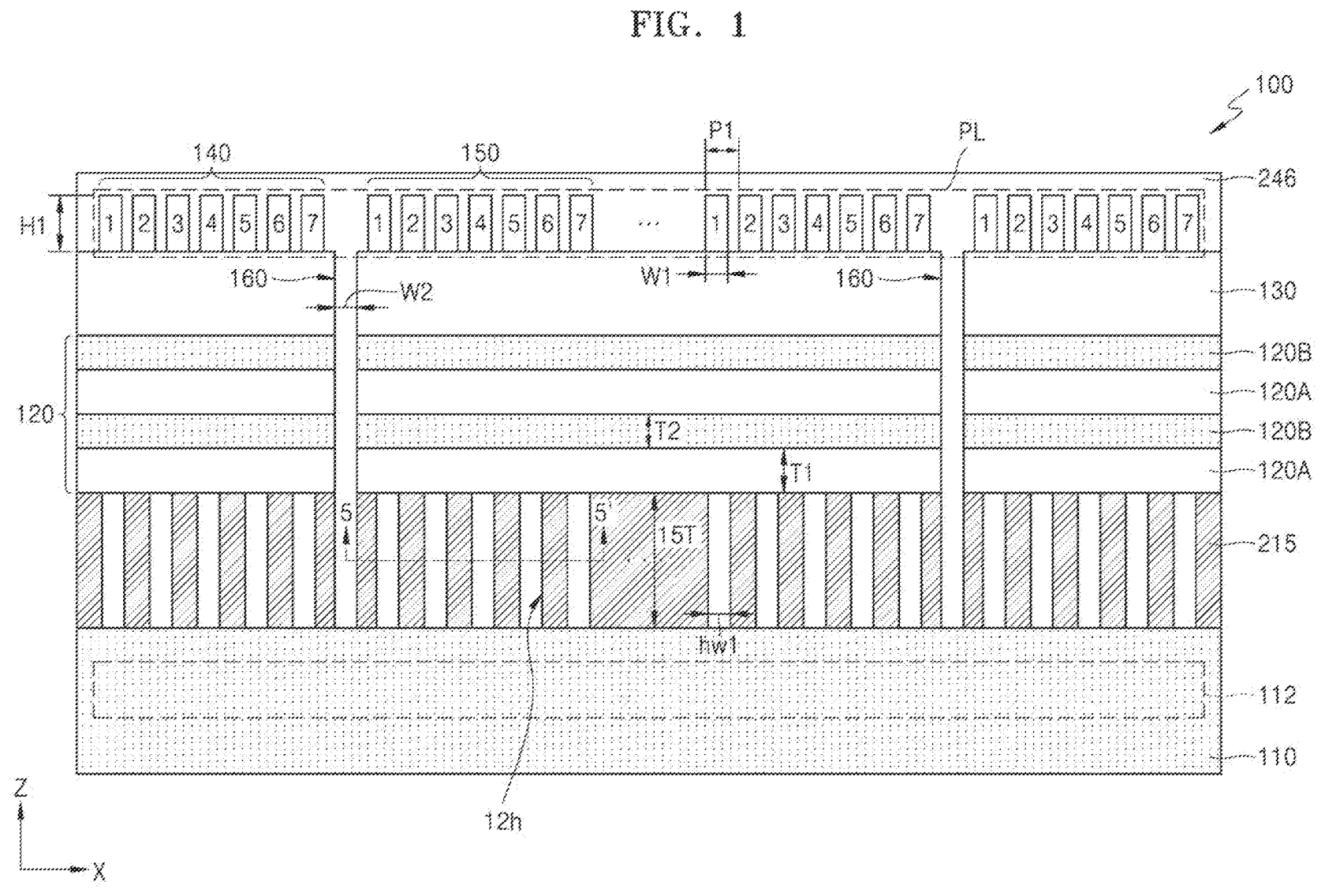

FIG. 1 is a cross-sectional view illustrating a first spatial light modulator according to an example embodiment. FIG. 1 illustrates a first spatial light modulator 100 according to an example embodiment.

Referring to FIG. 1, the first spatial light modulator 100 includes a substrate 110, and a blocking layer 215, a distributed Bragg reflector (DBR) layer 120, a cavity layer 130, and a pixel layer PL that are sequentially stacked on one surface of the substrate 110. In an example, the pixel layer PL may be covered (or at least partially covered) with a transparent insulating layer 246. In an example, the transparent insulating layer 246 may be a silicon oxide layer (e.g., SiO2), or may include a silicon oxide layer. In an example, the transparent insulating layer 246 may be omitted. In an example, the one surface of the substrate 110 may be a top surface of the substrate 110, but may be a bottom surface or a side surface according to a viewpoint. The first spatial light modulator 100 includes a plurality of first trenches 160 sequentially passing through the blocking layer 215, the DBR layer 120, and the cavity layer 130. In an example, when the pixel layer PL is covered with the transparent insulating layer 246, the first trenches 160 may be formed to pass through the transparent insulating layer 246. The first spatial light modulator 100 may further include other components.

In an example, the substrate 110 may be a semiconductor substrate, for example, a silicon substrate, but is not limited thereto. A thickness of the substrate 110 may be determined by considering various factors, for example, may be determined by considering a form factor and/or heat emission when the first spatial light modulator 100 is applied to a product. In an example, the substrate 110 may include a circuit 112. The circuit 112 may include a circuit configured to operate and control the first spatial light modulator 100.

Figure 3:
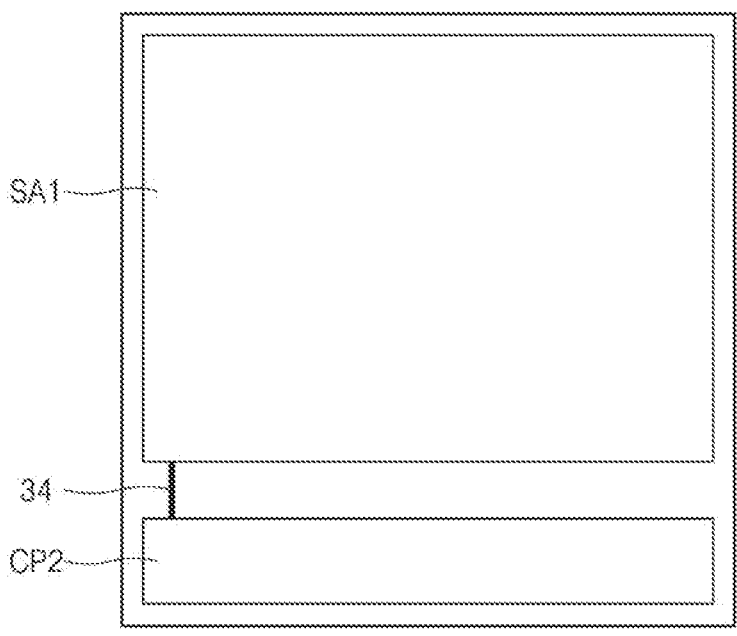
FIG. 3 is a diagram illustrating an example in which a circuit provided on a substrate in the first spatial light modulator of FIG. 1 is separately provided apart from a region in which spatial light modulation occurs, according to an example embodiment.

FIG. 2 is a diagram illustrating an example in which a circuit provided on a substrate in the first spatial light modulator of FIG. 1 is provided in a peripheral circuit unit in a region in which spatial light modulation occurs, according to an example embodiment. FIG. 3 is a diagram illustrating an example in which a circuit provided on a substrate in the first spatial light modulator of FIG. 1 is separately provided apart from a region in which spatial light modulation occurs, according to an example embodiment.

As described above, the circuit 112 may be provided in the substrate 110, but as illustrated in FIG. 2, may be provided in a peripheral circuit CP1 around a region SA1 in which spatial light modulation occurs. As illustrated in FIG. 2, the region SA1 in which spatial light modulation occurs may be a region including the rest except for the circuit 112 in FIG. 1.

In an example, the circuit 112 may be provided independently. For example, as illustrated in FIG. 3, the circuit 112 may be included in a circuit CP2 provided at a position spaced apart from the region SA1 in which spatial light modulation occurs. The circuit CP2 may be connected to the region SA1 by an electrical wire 34. The circuit CP2 may be provided in the form of a chip.

Referring to FIG. 1 again, the blocking layer 215 may be a material layer provided to prevent heat generated from the pixel layer PL from being transferred to the substrate 110 when the spatial light modulator 100 operates, and the operation of the blocking layer 215 may not be limited thereto. In an example, a thickness 15T of the blocking layer 215 may be less than or equal to several tens of micrometers (μm), for example, about 1 μm to about 10 μm, but is not limited thereto. In an example, the blocking layer 215 may be a silicon oxide layer (e.g., SiO2) or a silicon nitride layer (SiNx), or may include a material layer thereof, but may not be limited thereto.

The blocking layer 215 may include a plurality of holes 12h. The plurality of holes 12h may be an example of members or elements that may be provided in the blocking layer 215 to further increase a heat blocking effect of the blocking layer 215. The plurality of holes 12h may be distributed to form an array on the one surface of the substrate 110. In an example, the plurality of holes 12h may be uniformly distributed on the one surface of the substrate 110, and the plurality of holes 12h may correspond to each of pixels 140 and 150. In an example, the holes 12h may be below a top surface of the blocking layer 215.

As illustrated in FIG. 1, the number of holes 12h corresponding to each of the pixels 140 and 150 is five, but is illustrated only for description. Five or less holes or five or more holes may be located in a region of the blocking layer 215 corresponding to each of the pixels 140 and 150. For example, at least one hole may be located or ten or more holes may be located in the region of the blocking layer 215 corresponding to each of the pixels 140 and 150.

As illustrated in FIG. 1, each hole 12h has a width that is constant from a top end to a bottom end, but the width may not be constant. For example, each hole 12h may have a structure in which a width thereof decreases from a top end to a bottom end, but is not limited thereto. In an example, each hole 12h may have a width hw1 that is less than or equal to several μm. For example, the width hw1 of each hole 12h may be less than or equal to about 1 μm, or less than or equal to about 0.5 μm or less, but is not limited thereto. The width hw1 of each hole 12h is measured in a first direction (e.g., an X-axis direction). When the width hw1 of each hole 12h changes from the top end to the bottom end, the width hw1 may represent the maximum width of each hole 12h. In an example, the maximum width of the hole 12h may be located between the top end and the bottom end of the hole 12h, and the width may be expressed as a diameter.

In an example, the number of holes 12h formed in the blocking layer 215 may be determined by considering an amount of heat generated in the pixel layer PL and/or presence or absence of another heat blocking unit in addition to the blocking layer 215.

In an example, a ratio occupied by a plurality of holes 12h in the blocking layer 215 (i.e., a fill factor) may be several percent to several tens of percent. For example, a fill factor of a plurality of holes 12h in the blocking layer 215 may be about 5% to about 70%, or about 10% to about 45%, but is not limited to the range, and may exceed 70% (e.g., less than or equal to 80%), or may be less than 5%. The number of a plurality of holes 12h provided in the blocking layer 215 may be determined within a range satisfying the fill factor.

The sizes, arrangement forms, and the like of the plurality of holes 12h are described below.

The DBR layer 120, which is provided as an example of a lower reflective layer for reflecting light incident on the first spatial light modulator 100, may be formed on the blocking layer 215 to cover the plurality of holes 12h. In an example, the DBR layer 120 may include a plurality of first layers 120A and a plurality of second layers 120B that are repeatedly and alternately stacked in a direction perpendicular to the blocking layer 215 (e.g., a direction parallel to a Z axis). In an example, the first and second layers 120A and 120B may have different thermal conductivity and refractive indexes from each other. In an example, the thermal conductivity of the first layer 120A may be lower than the thermal conductivity of the second layer 120B, but may be opposite to each other. In an example, the first layer 120A and the second layer 120B may include different materials from among Si, Si3N4, SiO2, and TiO2. For example, the first layer 120A may include a silicon oxide layer, and the second layer 120B may include a silicon (Si) layer as a semiconductor layer.

In an example, a thickness T1 of the first layer 120A and a thickness T2 of the second layer 120B may be the same as or different from each other.

In an example, the thickness T1 of the first layer 120A satisfies Equation (1) below.

$$T1 = \lambda / (4 \times n1) \qquad (1)$$

In Equation (1), λ denotes a wavelength of light (e.g., an infrared band) incident on the first spatial light modulator 100, and n1 denotes the refractive index of the first layer 120A. Equation (1) may also be applied to other spatial light modulators described below.

In an example, when the wavelength λ of the light incident on the first spatial light modulator 100 is 1550 nm and the refractive index n1 of the first layer 120A is 1.46, the thickness T1 of the first layer 120A is about 265 nm according to Equation (1).

In an example, the thickness T2 of the second layer 120B may be less than the thickness T1 of the first layer 120A. The thickness T2 of the second layer 120B satisfies Equation (2) below.

$$T2 = N / (4 \times n2) \qquad (2)$$

In Equation (2), A denotes a wavelength of light incident on the first spatial light modulator 100, and n2 denotes the refractive index of the second layer 120B. Equation (2) may also be applied to other spatial light modulators described below.

In an example, when the wavelength λ of the light incident on the first spatial light modulator 100 is 1550 nm and the refractive index n2 of the second layer 120B is 3.28, the thickness T2 of the second layer 120B is about 118 nm according to Equation (2).

As illustrated in FIG. 1, the DBR layer 120 includes the first and second layers 120A and 120B that are alternately stacked twice, but the first and second layers 120A and 120B may be alternately stacked twice or less, or twice or more. The uppermost layer of the DBR layer 120 is the second layer 120B, and may directly contact the cavity layer 130.

The cavity layer 130, which resonates and amplifies incident light between the DBR layer 120 and the pixel layer PL, may be a single layer. The cavity layer 130 may include a material layer having low thermal conductivity. For example, the thermal conductivity of the cavity layer 130 may be lower than the thermal conductivity of the second layer 120B of the DBR layer 120. In an example, the cavity layer 130 may include a silicon oxide layer (e.g., SiO2), but is not limited thereto. A thickness of the cavity layer 130 may vary according to a wavelength of incident light. In an example, the cavity layer 130 may have a thickness λ/3 corresponding to ⅓ of a wavelength of incident light, but is not limited thereto. For example, the thickness of the cavity layer 130 may be less than or greater than λ/3. For example, when the wavelength λ of the incident light is 1550 nm, the cavity layer 130 may be designed to generate optimal resonance in a thickness range of about 500 nm to about 600 nm.

The pixel layer PL includes a plurality of active high contrast gratings (HCGs), identified as 1, 2, 3, 4, 5, 6, and 7 in multiple groups. Shapes and dimensions of the plurality of HCGs may be the same as or substantially the same as one another. A width W1 and a height H1 of each of the HCGs may be less than a wavelength of incident light. In an example, a desired reflectance may be obtained in a desired wavelength band by controlling the height (thickness) H1, the width W1, and/or a pitch of each of the HCGs. For example, the height H1 of each of the HCGs may be designed to have a high reflectance with respect to incident light, for example, may be designed to have a reflectance greater than or equal to about 70%.

The DBR layer 120 provided under the pixel layer PL operates as a lower reflective layer or a lower mirror layer, and thus may be represented as a lower reflective layer or a lower mirror layer, and the pixel layer PL operating as an upper reflective layer may be expressed as an upper reflective layer or an upper mirror layer.

The plurality of HCGs included in the pixel layer PL may be arranged in a one-dimensional (1D) manner. In addition, in the plurality of HCGs, an arrangement period P1 of each of the HCGs may be shorter than the wavelength of incident light. Accordingly, the pixel layer PL may be referred to as an active meta surface or an active meta surface layer, and each of the HCGs may be referred to as an active meta pattern or an active meta diffraction pattern. A material of each of the HCGs may be amorphous silicon or crystalline silicon (e.g., polycrystalline silicon), but is not limited thereto. In an example, the material of each of the HCGs may be polycrystalline silicon having a relatively small grain size.

For convenience of description, the plurality of HCGs of the pixel layer PL are depicted to be divided into a first pixel 140 and a second pixel 150. However, the pixel layer PL may include a plurality of first pixels 140 and a plurality of second pixels 150. The first pixel 140 and the second pixel 150 are spaced apart from each other.

In an example, each of the first pixels 140 may include first to seventh HCGs, but is not limited thereto. The first pixel 140 may also include seven or less HCGs, or seven or more HCGs. In an example, each of the second pixels 150 may include first to seventh HCGs, but is not limited thereto. The second pixel 150 may include seven or less HCGs, or seven or more HCGs. Intervals between the HCGs included in the first and second pixels 140 and 150 may be the same as or substantially the same as each other. The intervals between the HCGs included in the first and second pixels 140 and 150 are less than an interval between the first and second pixels 140 and 150.

In an example, each of the HCGs included in the first and second pixels 140 and 150 may have a PIN diode structure or a layer structure of an NIN or PIN, and thus, a current may be applied to each of the HCGs. The layer structure of each of the HCGs is described below.

When a current is applied to each of the HCGs, an internal resistance of each of the HCGs generates Joule heat, and a temperature of a corresponding HCG increases. Due to the temperature change, a refractive index of each of the HCGs and a reflectance with respect to incident light may be changed.

By using the principle described above, when a plurality of HCGs are used as one of the pixels 140 and 150 to form a modulation unit, and an angle of emitted light (primary reflected light) of light incident on the first spatial light modulator 100 may be adjusted by applying a current to some pixels (e.g., 150) according to a particular current application pattern. Therefore, beam scanning using the first spatial light modulator 100 may be achieved by changing the current application pattern.

The trench 160 is located between the first pixel 140 and the second pixel 150. FIG. 1 is a cross-sectional view, and thus, the trench 160 passes through a stack including the cavity layer 130, the DBR layer 120, and the blocking layer 215. In addition, when the transparent insulating layer 246 is also provided, the trench 160 passes through the stack also including the transparent insulating layer 246. Accordingly, in FIG. 1, the trench 160 may be expressed as a through-hole.

The trench 160 is formed between the plurality of pixels 140 and 150, and thus, the cavity layer 130, the DBR layer 120, and the blocking layer 215 are divided to correspond to the plurality of pixels 140 and 150. In other words, the trench 160 is provided, and thus, the cavity layer 130 formed under the first pixel 140 and the second pixel 150 may not be connected to each other and may be disconnected from each other, and the DBR layer 120 and the blocking layer 215 may be the same. Accordingly, heat generated from a driving pixel (e.g., pixel 150) may be blocked from being transferred to a non-driving pixel (e.g., pixel 140).

In addition, the blocking layer 215 includes the plurality of holes 12$h$, and thus, transfer of heat downward the driving pixel (e.g., pixel 150) may be minimized or blocked. For example, the pixel 150 is regarded as a driving pixel and the pixel 140 is regarded as a non-driving pixel. Targets of the driving and non-driving pixels may be changed.

As a result, the hole 12$h$ and/or the trench 160 are provided to reduce a heat transfer ratio at which heat generated from the driving pixel 150 is transferred out of the driving pixel 150. The inclusion of the hole 12$h$ and/or the trench 160 significantly reduces the heat transfer ratio compared to when they are not present. The results of a heat transfer simulation with and without the hole 12$h$ are provided and are described below.

In an example, a depth of the trench 160 may be adjusted, and accordingly, a range of layers disconnected by the trench 160 or a thickness disconnected by the trench 160 within a layer may be changed.

The trench 160 contacts the top surface of the substrate 110. The top surface of the substrate 110 exposed through the trench 160 becomes a bottom of the trench 160. A width W2 of the trench 160 may be less than the period P1 of the HCG. The width W2 of the trench 160 may be the same as or different from the width W1 of the HCG. The trench 160 may be filled with air or other materials, or may be maintained in a vacuum state or a substantial vacuum state that is not filled with any materials.

The DBR layer 120 and the cavity layer 130 may be divided by the trench 160 to correspond to the respective pixels 140 and 150. In other words, the DBR layer 120 and the cavity layer 130 may be divided by the trench 160 in the same number as the number of first and second pixels 140 and 150. Accordingly, the first and second pixels 140 and 150 and the stacked DBR layer 120 and cavity layer 130 may correspond to one another on a one-to-one basis. In other words, one pixel 140 or 150 is located on the divided one cavity layer 130.

As described above, the trench 160 physically separates the DBR layer 120 and the cavity layer 130 to correspond to the pixels 140 and 150 on a one-to-one basis, and thus may minimize or prevent heat transfer from the driving pixel 150 to the adjacent non-driving pixel 140. Accordingly, the trench 160 may serve as a heat blocking member or a heat blocking means for blocking heat transfer between the pixels 140 and 150. When the trench 160 is filled with a material, the corresponding material may have lower thermal conductivity than the cavity layer 130, the DBR layer 120, the blocking layer 215, and the substrate 110. Accordingly, the material filling the trench 160 may also serve as an example of a heat blocking member. In an example, when the trench 160 is filled with the above-described material having low thermal conductivity, the corresponding material may be a material having lower thermal conductivity than silicon oxide (e.g., SiO2) described below, but is not limited thereto.

The trench 160 provides increased independence for the driving pixel 150 and the non-driving pixel 140. In addition, the trench 160 causes a greater temperature difference between the driving pixel 150 and the non-driving pixel 140 compared to existing spatial light modulators, and thus, emitted light may be focused at a desired position. Also, the use of the trench 160 may reduce an intensity of a high-order beam or zero-order beam, and thus, output and efficiency of a spatial light modulator may be increased. In other words, accuracy and efficiency of light scanning of the spatial light modulator may be increased.

In addition, the hole 12$h$ may be provided in addition to the trench 160, and thus, the merit of having the trench 160 may be strengthened, and a heat blocking effect may be increased more than when only the trench 160 is provided. Accordingly, the temperature difference between the driving pixel 150 and the non-driving pixel 140 at the same current as a current applied when only the trench 160 is provided may be higher than when only the trench 160 is provided. Accordingly, when the trench 160 and the hole 12$h$ are provided together, even at a lower current than a current applied when only the trench 160 is provided, the same effect as an effect obtained when only the trench 160 is provided may be obtained. In other words, when the trench 160 and the hole 12$h$ are provided together, operating power of the first spatial light modulator 100 may be lowered.

Figure 4:
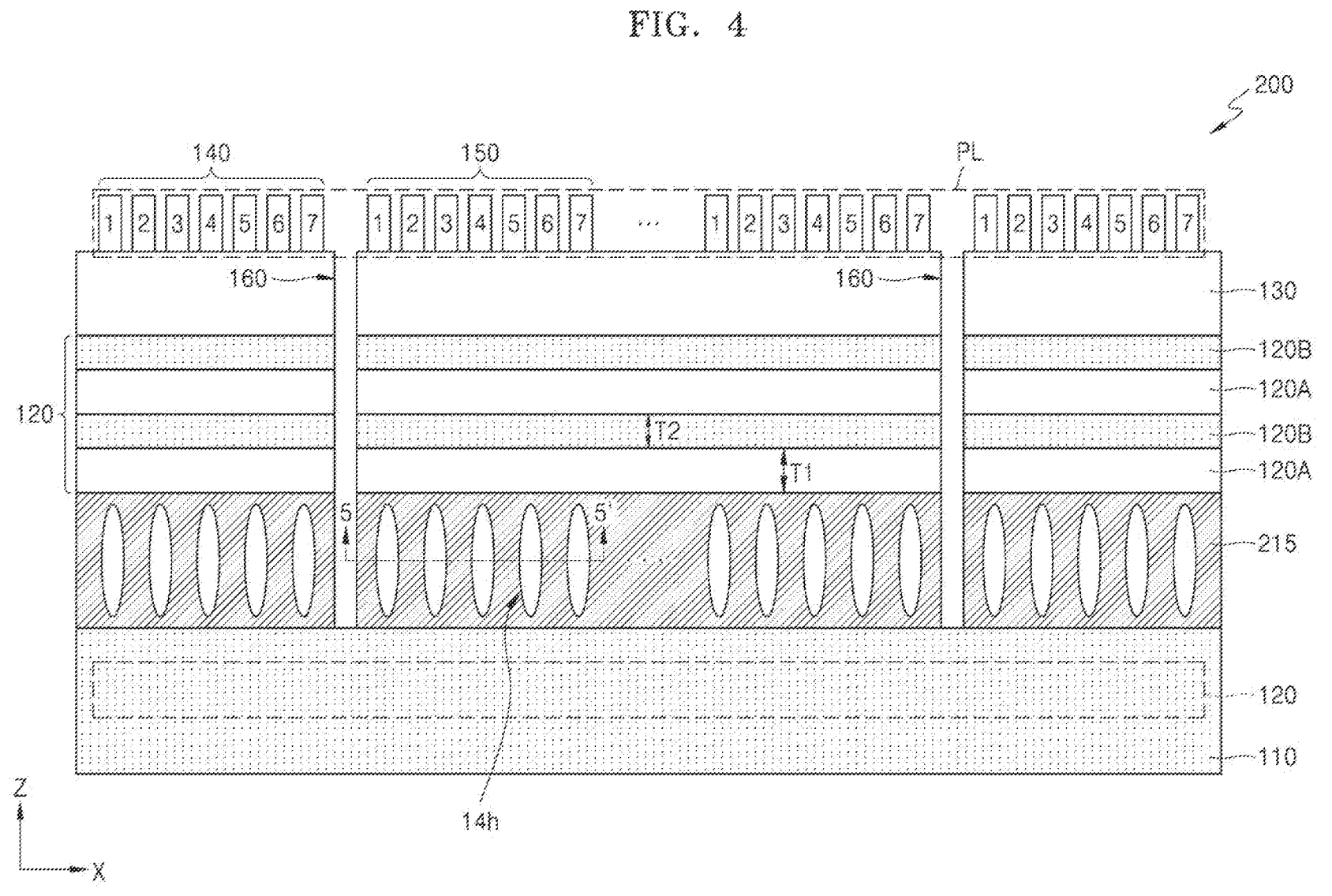

FIG. 4 is a cross-sectional view illustrating a second spatial light modulator according to an example embodiment. FIG. 4 illustrates a second spatial light modulator 200 according to an example embodiment. FIG. 4 may include similar features as those described with respect to the first spatial light modulator 100 of FIG. 1, and repeated descriptions may be omitted.

Referring to FIG. 4, the second spatial light modulator 200 includes a blocking layer 215 having a plurality of second holes 14$h$. In an example, a second hole 14$h$ may have a different shape feature from the first hole 12$h$. For example, the second hole 14$h$ has an elliptical shape having a long axis in a second direction (e.g., a Z-axis direction), and is fully buried in the blocking layer 215. Therefore, a width of the second hole 14$h$ varies between a top end and a bottom end thereof, the top end does not contact a DBR layer 120, and the bottom end does not contact a substrate 110. Heights (lengths in the Z-axis direction) of a plurality of second holes 14$h$ within the blocking layer 215 may be the same as or substantially the same as each other.

Figure 5:
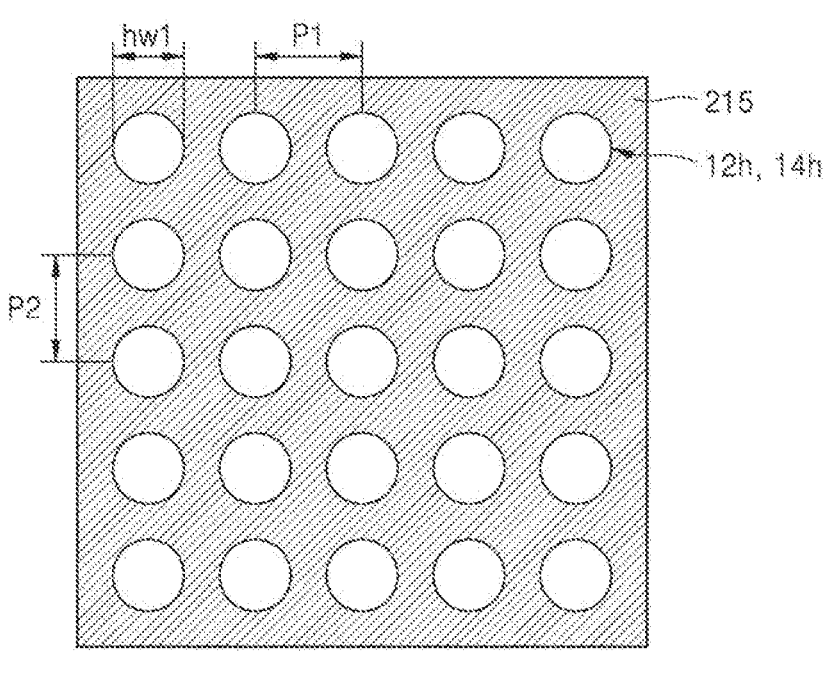
FIG. 5 is a diagram taken along line 5-5' of FIG. 1 and/or taken along line 5-5' direction of FIG. 4, according to an example embodiment.

FIG. 5 is a diagram taken along line 5-5' of FIG. 1 and/or taken along line 5-5' direction of FIG. 4, according to an example embodiment. FIG. 5 is a plan view illustrating an arrangement (array) form of a plurality of first and second holes 12$h$ and 14$h$ provided in the blocking layers 215 of the first and second spatial light modulators 100 and 200, and may illustrate a plane taken in a 5-5' direction of FIG. 1 or a plane taken in a 5-5' direction of FIG. 4.

Referring to FIG. 5, a plurality of first and second holes 12$h$ and 14$h$ are arranged to form a lattice-shaped array.

The plurality of first and second holes 12$h$ and 14$h$ are arranged at a first pitch P1 in a first direction (e.g., an X-axis direction), and are arranged at a second pitch P2 in a third direction (e.g., a Y-axis direction) that is perpendicular to or substantially perpendicular to the first direction. In an example, the first and second pitches P1 and P2 may be the same as or different from each other. Sizes (e.g., diameters) hw1 of the plurality of first and second holes 12*h* and 14*h* may be the same as or substantially the same as one another. In an example, from among the plurality of first holes 12*h*, diameters of two adjacent first holes 12*h* may be different from each other. In an example, from among the plurality of second holes 14*h*, diameters of two adjacent second holes 14*h* may be different from each other. An example thereof is described below.

Figure 6:
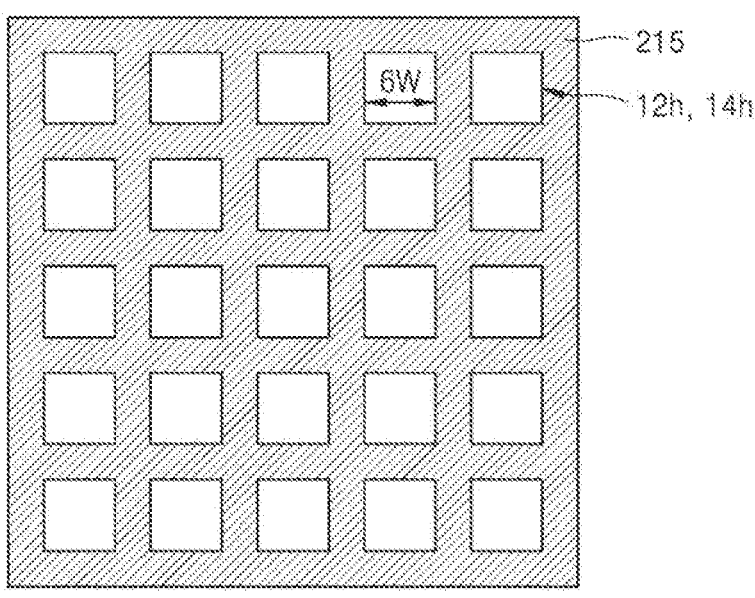
FIG. 6 is a diagram illustrating an example in which a planar shape of a hole in the plan view of FIG. 5 is non-circular, according to an example embodiment.
Figure 6:

FIG. 6 is a diagram illustrating an example in which a planar shape of a hole in the plan view of FIG. 5 is non-circular, according to an example embodiment. In an example, cross sections of the first and second holes 12*h* and 14*h* are circular but may be non-circular, and may be, for example, quadrangles as illustrated in FIG. 6. FIG. 6 illustrates the quadrangles as squares, but the quadrangles may be rectangles. As illustrated in FIG. 6, widths 6W or breadths of two adjacent quadrangles are the same as each other, but the widths 6W of the two adjacent quadrangles may be different from each other.

Figure 7:
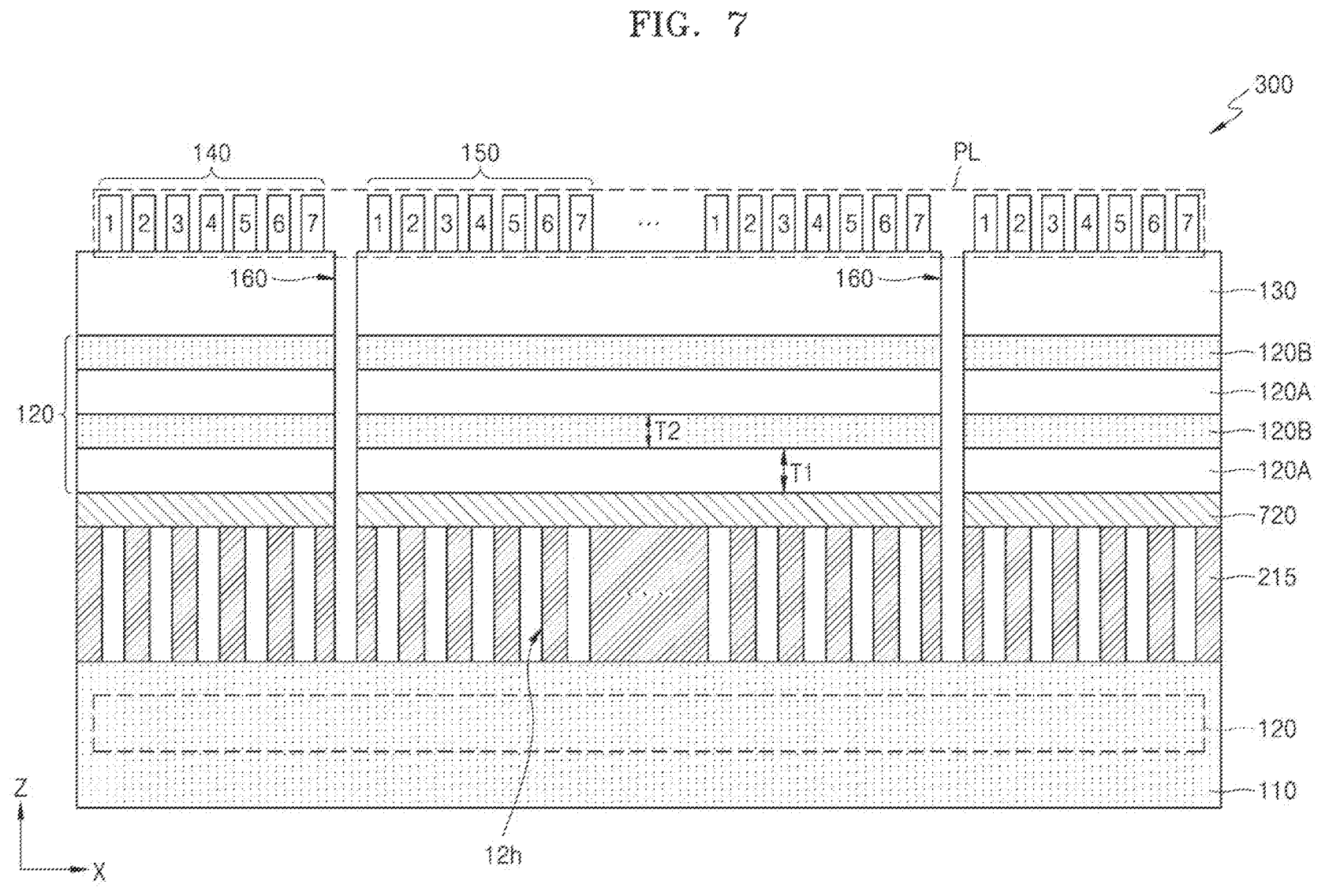

FIG. 7 is a cross-sectional view illustrating a third spatial light modulator according to an example embodiment. FIG. 7 illustrates a third spatial light modulator 300 according to an example embodiment.

FIG. 7 may include features similar to those described with respect to the first and second spatial light modulators 100 and 200 described above, and repeated descriptions may be omitted.

Referring to FIG. 7, the third spatial light modulator 300 includes a planarization layer 720 between a DBR layer 120 and a blocking layer 215. The planarization layer 720 may provide a flat stacked surface on a material layer formed on the planarization layer 720, and may be provided to prevent a non-flat surface, which may be formed while providing holes 12*h* in the blocking layer 215, from being transferred to a material layer formed on the blocking layer 215. When the planarization layer 720 is provided, a width of the hole 12*h* formed in the blocking layer 215 may increase more than when the planarization layer 720 is not provided. In other words, when the planarization layer 720 is provided, a fill factor of the hole 12*h* of the blocking layer 215 may increase more than when the planarization layer 720 is not provided.

The planarization layer 720 may also be applied to the second spatial light modulator 200.

In an example, a material of the planarization layer 720 may include at least one of SiO2, a-Si, and SiN.

Figure 8:
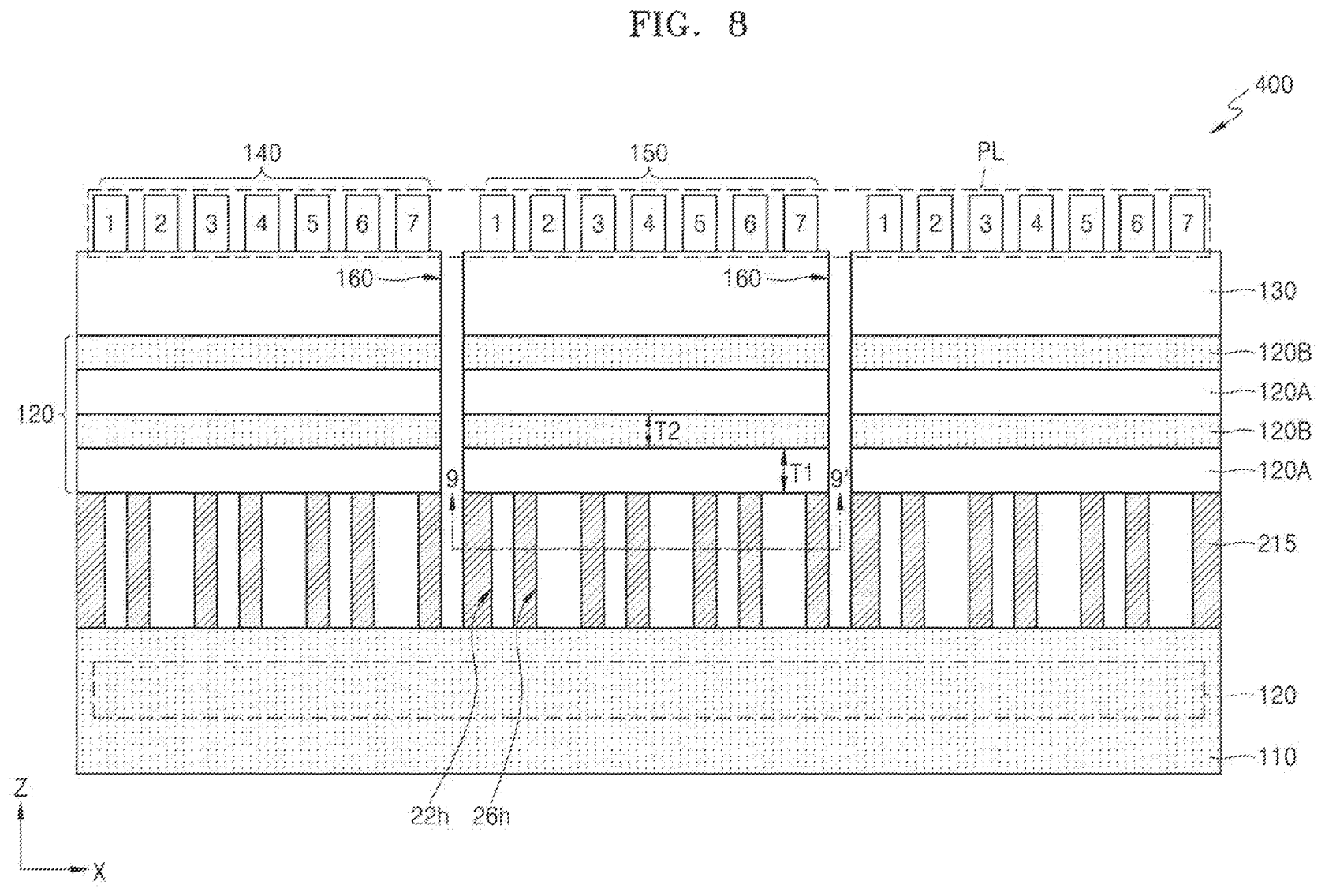

FIG. 8 is a cross-sectional view illustrating a fourth spatial light modulator according to an example embodiment. FIG. 8 illustrates a fourth spatial light modulator 400 according to an example embodiment.

FIG. 8 may include features similar to those described with respect to the first, second, third spatial light modulators 100, 200, and 300 described above, and repeated descriptions may be omitted.

Referring to FIG. 8, a blocking layer 215 of the fourth spatial light modulator 400 may include third and fourth holes 22*h* and 26*h* having different shape features. For example, diameters of the third and fourth holes 22*h* and 26*h* may be different from each other.

Figure 9:
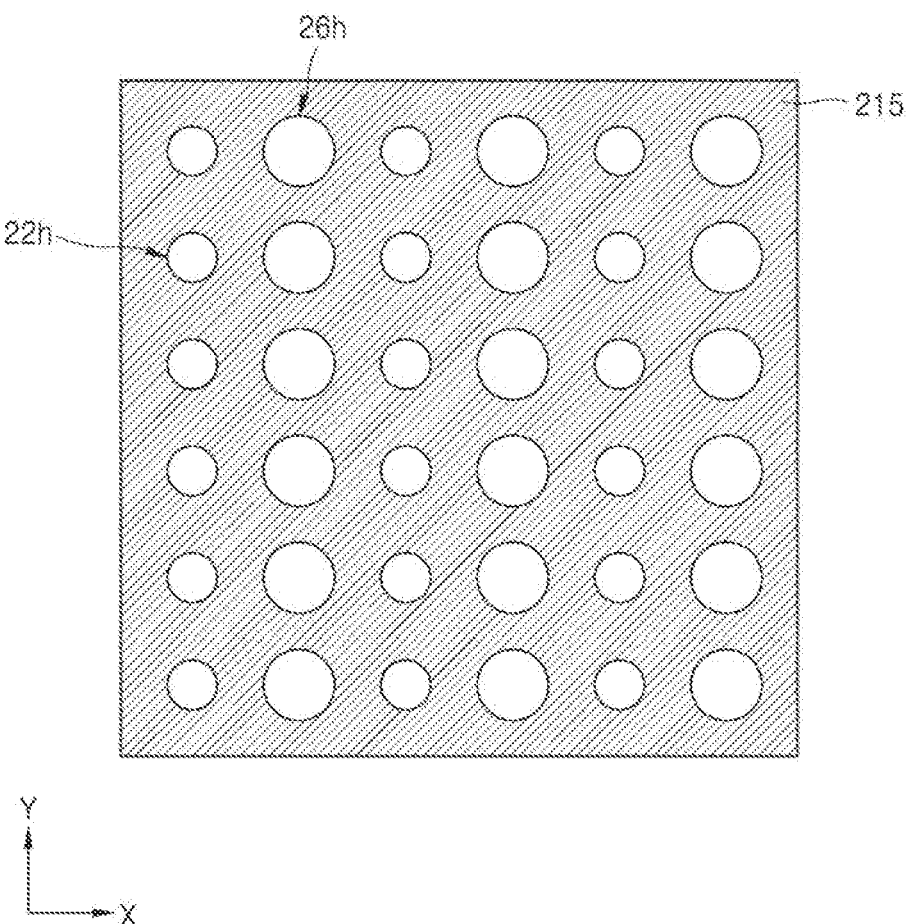
FIG. 9 is a diagram taken along line 9-9' direction of FIG. 8 according to an example embodiment.

FIG. 9 is a diagram taken along line 9-9' direction of FIG. 8 according to an example embodiment. FIG. 9 is a plan view taken in a 9-9' direction of FIG. 8.

Referring to FIGS. 8 and 9 together, a plurality of third and fourth holes 22*h* and 26*h* form an array. One pixel may include a plurality of third holes 22*h* and a plurality of fourth holes 26*h*, and the plurality of third and fourth holes 22*h* and 26*h* may be repeatedly and alternately arranged in a first direction (e.g., an X-axis direction), and the arrangement in the first direction may be repeated in a third direction (e.g., a Y-axis direction). In an example, a plurality of third and fourth holes 22*h* and 26*h* may be repeatedly and alternately arranged even in the third direction.

Figure 10:
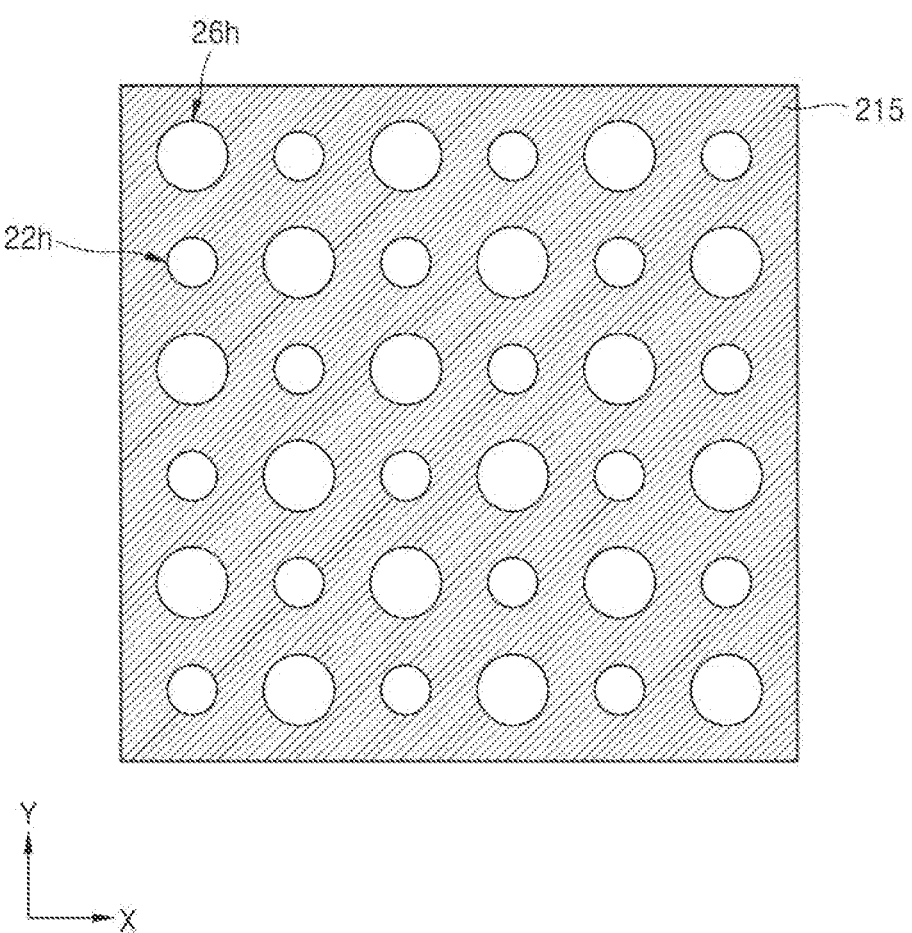
FIGS. 10, 11 and 12 are diagrams illustrating different arrangement forms of holes included in the third spatial light modulator of FIG. 8 according to an example embodiment.
Figure 11:
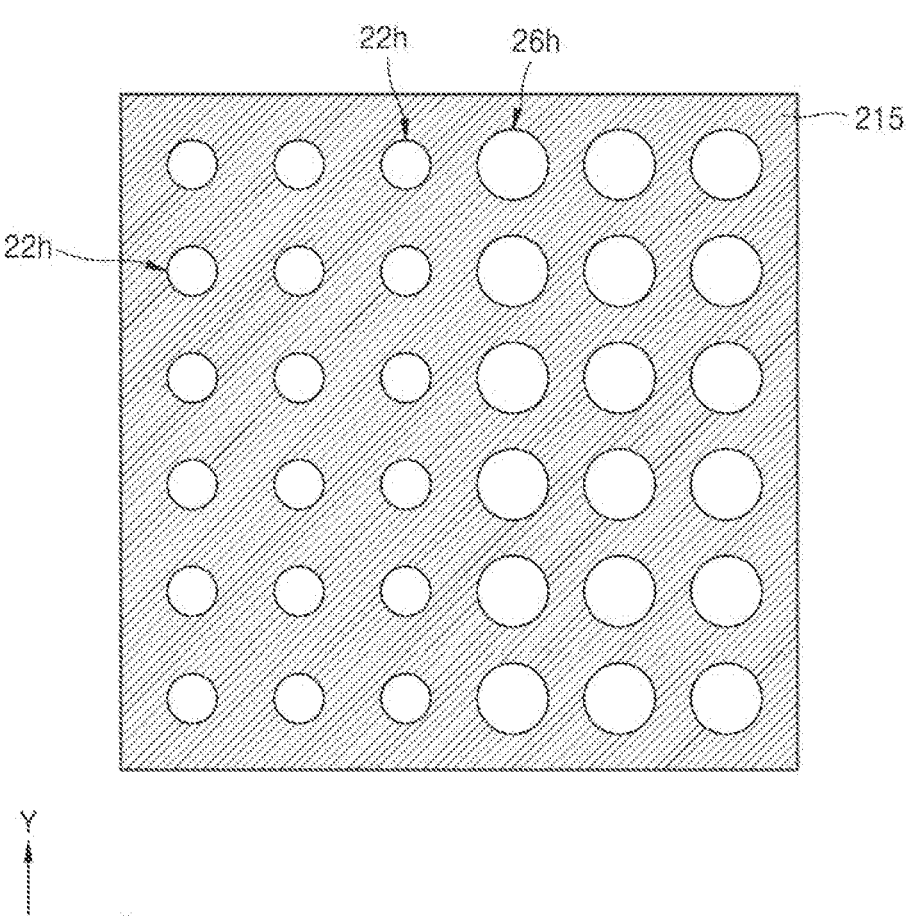
Figure 12:
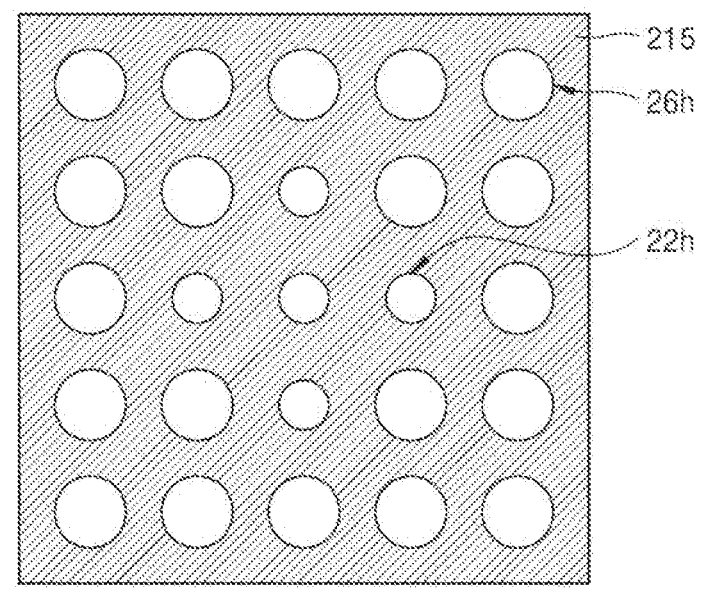
Figure 12:

FIGS. 10, 11 and 12 are diagrams illustrating different arrangement forms of holes included in the third spatial light modulator of FIG. 8 according to an example embodiment.

FIG. 10 illustrates an example of the arrangement form described above.

In an example, an arrangement form of a plurality of third and fourth holes 22*h* and 26*h* may be variously modified or designed according to a heat dissipation form or pattern of a driving pixel, and FIG. 11 illustrates an example thereof.

Referring to FIG. 11, three third holes 22*h* may be continuously arranged in the first direction (the X-axis direction), and then three fourth holes 26*h* may be continuously arranged. Also, the arrangement form in the first direction may be repeated in a second direction. As a result, when one pixel is divided into first and second regions to be symmetrical, the first region may include a plurality of holes having a first size, and the second region may include a plurality of holes having a second size that is different from the first size. As illustrated in FIG. 11, two adjacent holes 22*h* and 26*h* in one region may have the same or substantially the same diameters, and two adjacent holes 22*h* and 26*h* in another region may have different diameters.

FIG. 12 illustrates another arrangement form of a plurality of third and fourth holes 22*h* and 26*h*, and the plurality of third holes 22*h* may be arranged in a central region of one pixel, and the plurality of fourth holes 26*h* may be arranged in a remaining region (i.e., a region surrounding the central region). The arrangements of the third and fourth holes 22*h* and 26*h* may be opposite. In other words, the fourth holes 26*h* may be arranged in the central region, and the third holes 22*h* may be arranged around the fourth holes 26*h*.

As illustrated in FIGS. 9 to 12, the planar shapes of the third and fourth holes 22*h* and 26*h* (i.e., the shapes shown on the plan view) are circular, but the planar shapes of the third and fourth holes 22*h* and 26*h* may be quadrangles described with reference to FIG. 6, and in this case, widths or breadths of the third and fourth holes 22*h* and 26*h* may be different from each other.

In an example, even when a blocking layer 215 includes a plurality of third and fourth holes 22*h* and 26*h*, the planarization layer 720 described with reference to FIG. 7 may be provided.

In an example, insides of the holes 12*h*, 14*h*, 22*h*, and 26*h* in the first, second, third, and fourth spatial light modulators 100, 200, 300, and 400 described above may be in a vacuum state or a substantially vacuum state. In an example, air may be present in the holes 12*h*, 14*h*, 22*h*, and 26*h* of the first, second, third, and fourth spatial light modulators 100, 200, 300, and 400. For example, the holes 12*h*, 14*h*, 22*h*, and 26*h* may be filled with air.

Figure 13:
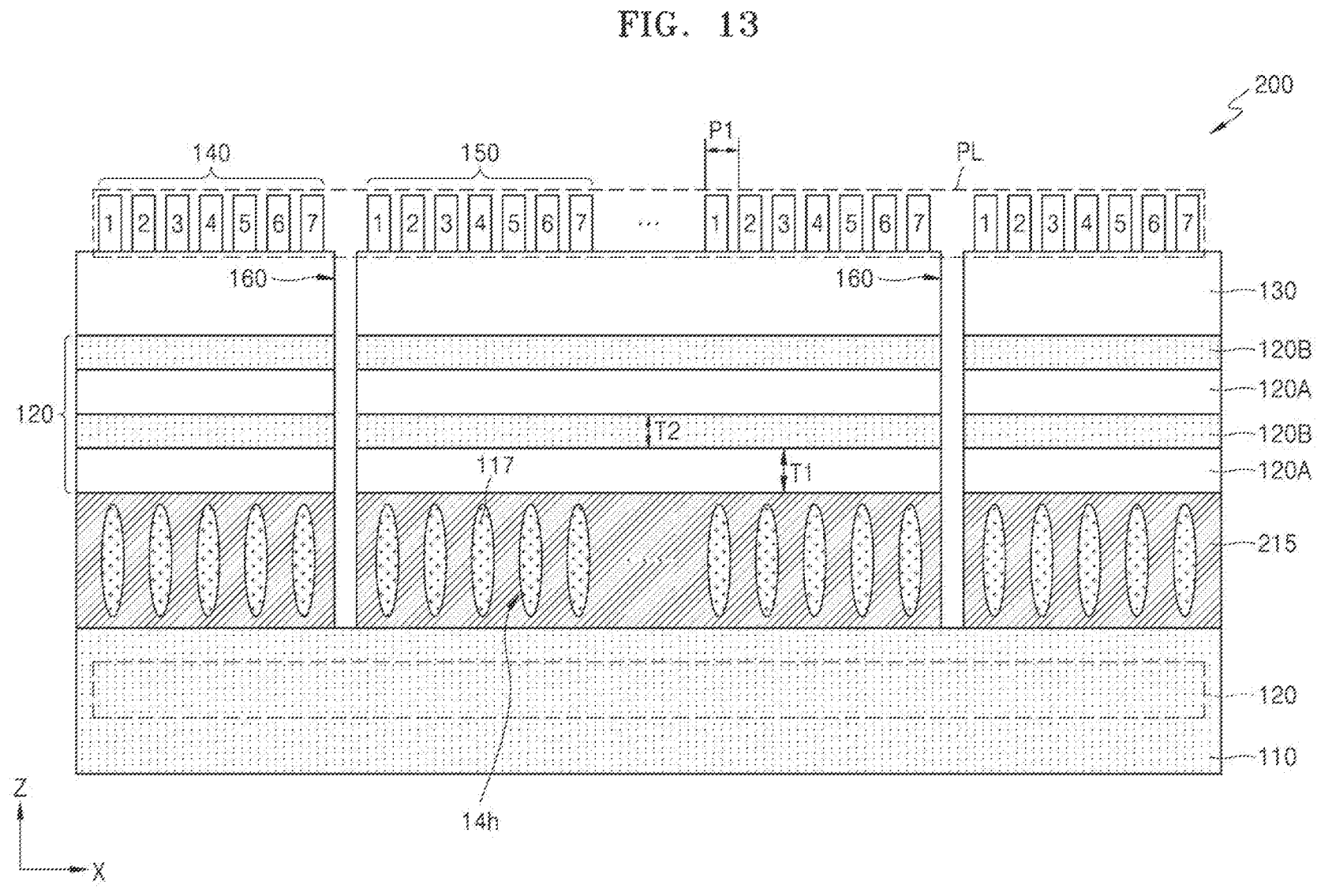

FIG. 13 is a cross-sectional view illustrating a second spatial light modulator including holes filled with a material having low thermal conductivity according to an example embodiment. In an example, the holes 12*h*, 14*h*, 22*h*, and 26*h* of the first, second, third, and fourth spatial light modulators 100, 200, 300, and 400 may be filled with a material having relatively low thermal conductivity, i.e., a material having a relatively low heat transfer coefficient. In an embodiment, the holes 12*h*, 14*h*, 22*h*, and 26*h* may be partially or fully filled with a material having a lower heat transfer coefficient than the blocking layer 215.

FIG. 13 illustrates an example thereof, and illustrates that the second hole 14*h* of the second spatial light modulator 200 of FIG. 4 is filled with a material 117 having a relatively low heat transfer coefficient. For example, the material 117, which fills the second hole 14*h* and has the low heat transfer coefficient, may be a material having lower thermal conductivity than silicon oxide (e.g., SiO2). In an example, the thermal conductivity of the material having lower thermal conductivity than the silicon oxide may be about 1 W/m·k or less, but is not limited thereto. In an example, the material having the lower thermal conductivity than the silicon oxide (e.g., SiO2) may include one of HfO2, MoS2 (1 to 0.1), Sb2S3, Sb2Se3 (0.4 to 0.8), polyimide (to 0.12), and polyamide, but is not limited thereto, and MoS2 may have directionality. In the example of the material having the low thermal conductivity, numerical values in parentheses indicate thermal conductivity.

Figure 14:
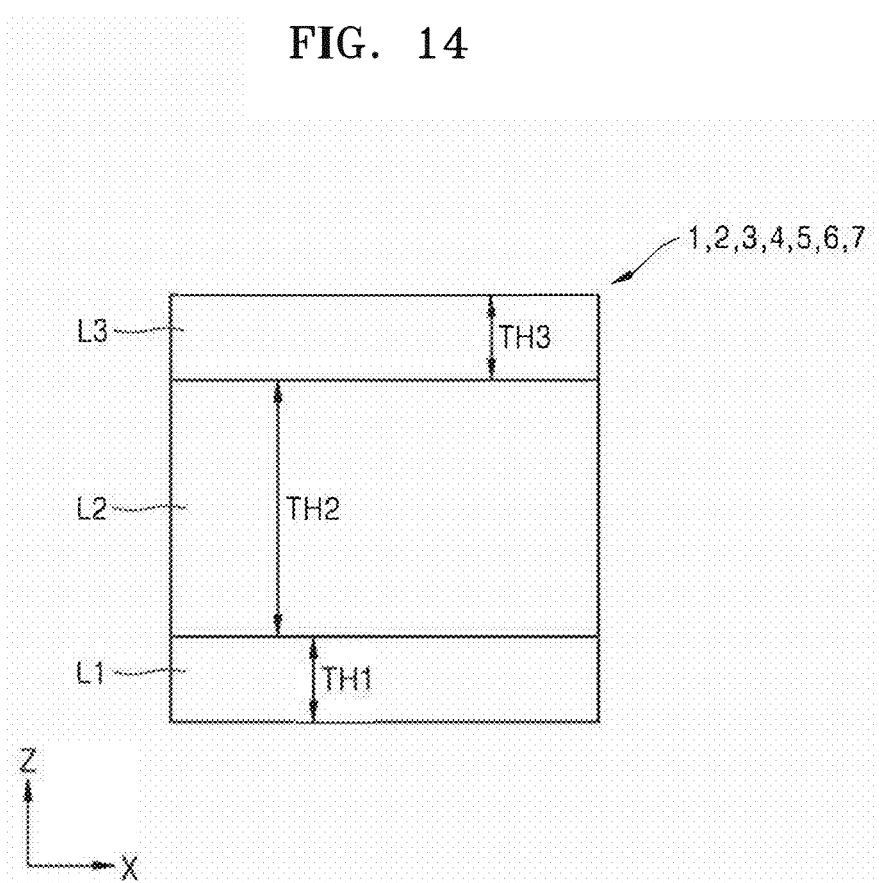
FIG. 14 is a cross-sectional view illustrating a layer structure of a high contrast grating (HCG) of a spatial light modulator, according to an example embodiment.

FIG. 14 is a cross-sectional view illustrating a layer structure of a high contrast grating (HCG) of a spatial light modulator, according to an example embodiment. FIG. 14 illustrates an example of a layer structure of each of the HCGs included in the pixel layer PL of the first, second, third, and fourth spatial light modulators 100, 200, 300, and 400 described above.

Referring to FIG. 14, each of the HCGs includes first, second, and third layers L1, L2, and L3 that are sequentially stacked. The first layer L1 may be a first doping layer including a first dopant, or may include a first doping layer. The third layer L3 may be a second doping layer including a second dopant, or may include a second doping layer. In an example, one of the first doping layer and the second doping layer may be a layer doped with P-type impurities, and the other one may be a layer doped with N-type impurities. For example, one of the first and second doping layers may be a P-type semiconductor layer (e.g., p-Si), and the other one may be an N-type semiconductor layer (e.g., n-Si). The second layer L2 may include an undoped layer that is not doped with impurities, and may include, for example, an intrinsic semiconductor layer (e.g., Si). In an example, a thickness TH2 of the second layer L2 may be greater than thicknesses TH1 and TH3 of the first and third layers L1 and L3. Accordingly, loss of incident light may be reduced, and heat generation efficiency according to application of a current may increase.

In an example, the thicknesses TH1 and TH3 of the first and/or third layers L1 and L3 may be about 10 nm to about 100 nm, and the thickness TH2 of the second layer L2 may be about 100 nm to about 600 nm.

In an example, a lower electrode layer may be provided on a bottom surface of the first layer L1, and an upper electrode layer may be provided on the third layer L3. In other words, the first to third layers L1 to L3 may be provided between the upper and lower electrode layers. A current may be applied to each of the HCGs through the upper and lower electrode layers.

Subsequently, a method of driving (operating) a spatial light modulator according to the example embodiments described above will be described.

Figure 15:
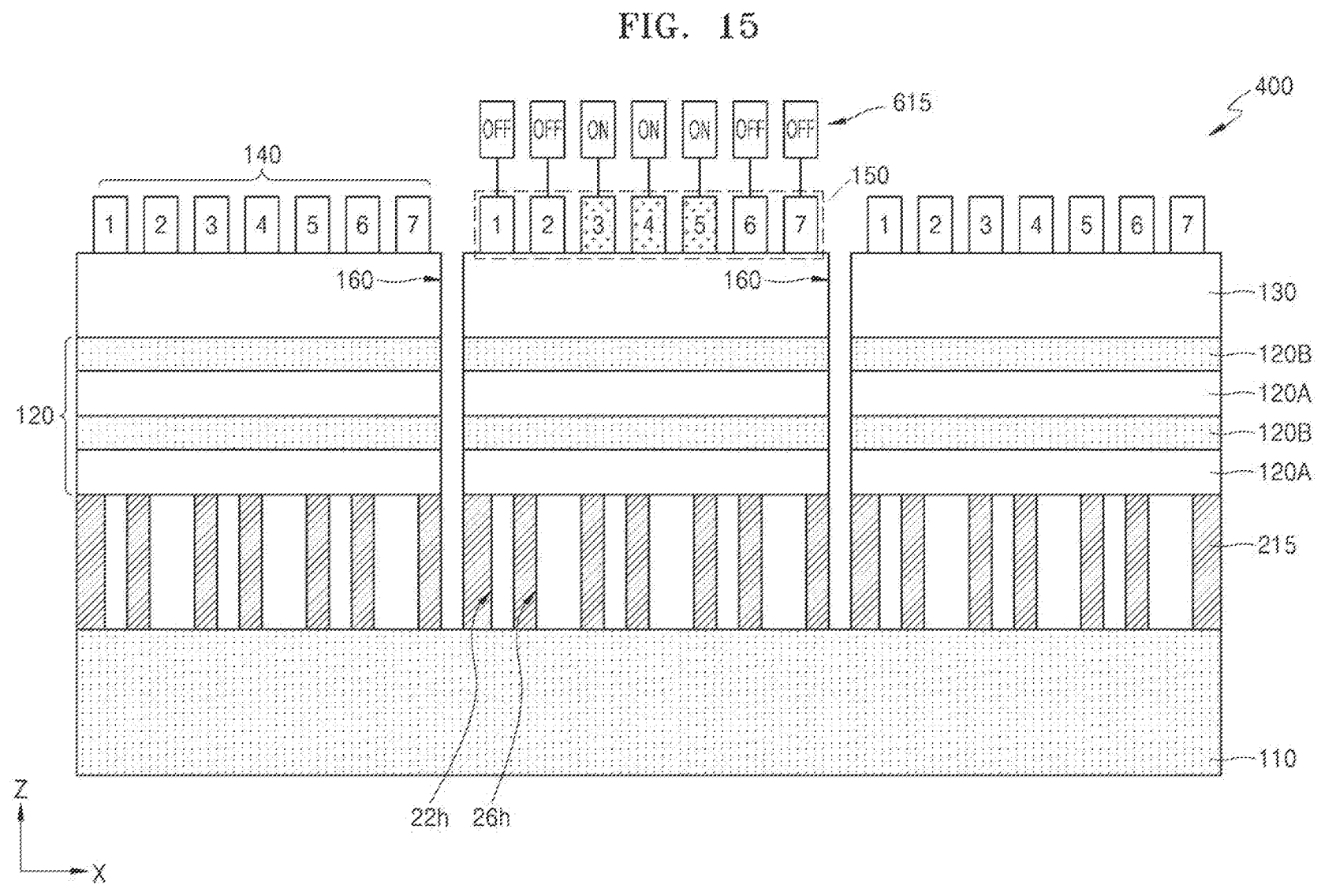

FIG. 15 is a cross-sectional view illustrating a first operating method of a spatial light modulator, according to an example embodiment according to an example embodiment. FIG. 15 illustrates a first operating method of the fourth spatial light modulator 400, according to an example embodiment. The first operating method may be equally applied to the other spatial light modulators 100, 200, and 300.

In the first operating method of FIG. 15, a first pixel 140 is regarded as a non-driving pixel and a second pixel 150 is regarded as a driving pixel. The above example applies equally to other operating methods below.

Referring to FIG. 15, a current is applied to only some HCGs from among first to seventh HCGs included in the second pixel 150, and a current is not applied to the remaining HCGs. For example, a current is applied only to the third, fourth, and fifth HCGs 3, 4, and 5, and a current is not applied to the first, second, sixth, and seventh HCGs 1, 2, 6, and 7 arranged at edges. In an example, a current of about 7 mA may be applied to the third, fourth, and fifth HCGs 3, 4, and 5, but the disclosure is not limited thereto.

The application of current may be controlled by a current controller 615 connected to each of the first to seventh HCGs included in the second pixel 150. For example, the current controllers 615 connected to the third, fourth, and fifth HCGs 3, 4, and 5 may be turned on, and the current controllers 615 connected to the first, second, sixth, and seventh HCGs 1, 2, 6, and 7 may be turned off. Current controllers may be individually connected to all pixels 140 and 150, but for convenience of illustration, only the current controllers 615 connected to one driving pixel are illustrated.

As described above, from among the HCGs included in the driving pixel 150, a current may not be applied to HCGs at an edge and a current may be applied only to the HCGs in an inner region, the trench 160 may be located between the driving pixel 150 and a non-driving pixel 140, and/or the holes 22*h* and 26*h* may be formed in the blocking layer 215. Accordingly, it is possible to minimize or block heat generated from the driving pixel 150 from being transferred to the adjacent non-driving pixel 140.

Figure 16:
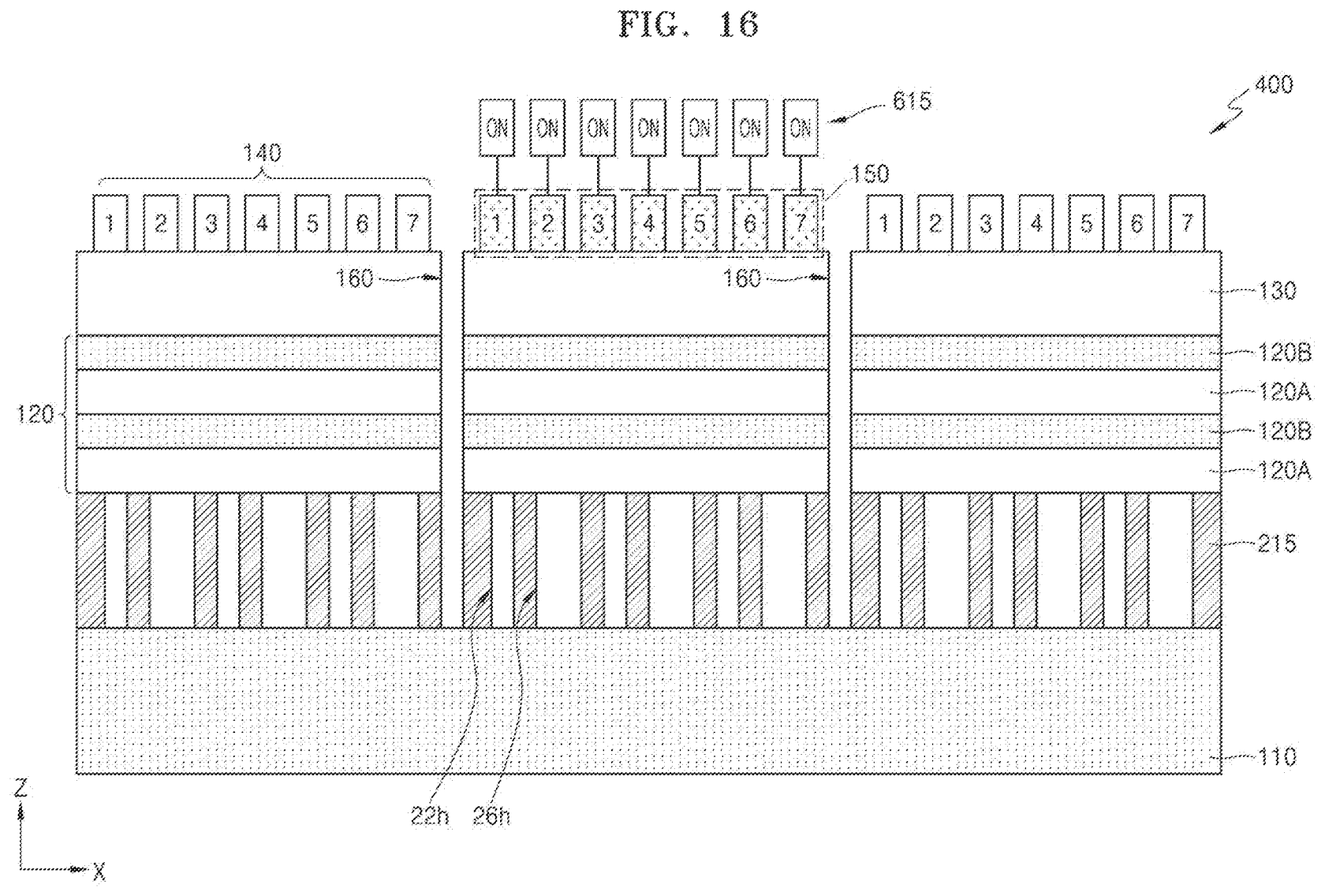

FIG. 16 is a cross-sectional view illustrating a second operating method of a spatial light modulator, according to an example embodiment according to an example embodiment. FIG. 16 illustrates a second operating method of the fourth spatial light modulator 400, according to an example embodiment. The second operating method may be equally applied to the other spatial light modulators 100, 200, and 300.

Referring to FIG. 16, unlike the first operating method, a current is applied to all of first to seventh HCGs included in a second pixel 150. Accordingly, all of the first to seventh HCGs are turned on. A current of about 7 mA may be applied to each of the first to seventh HCGs, but is not limited thereto.

Figure 17A:
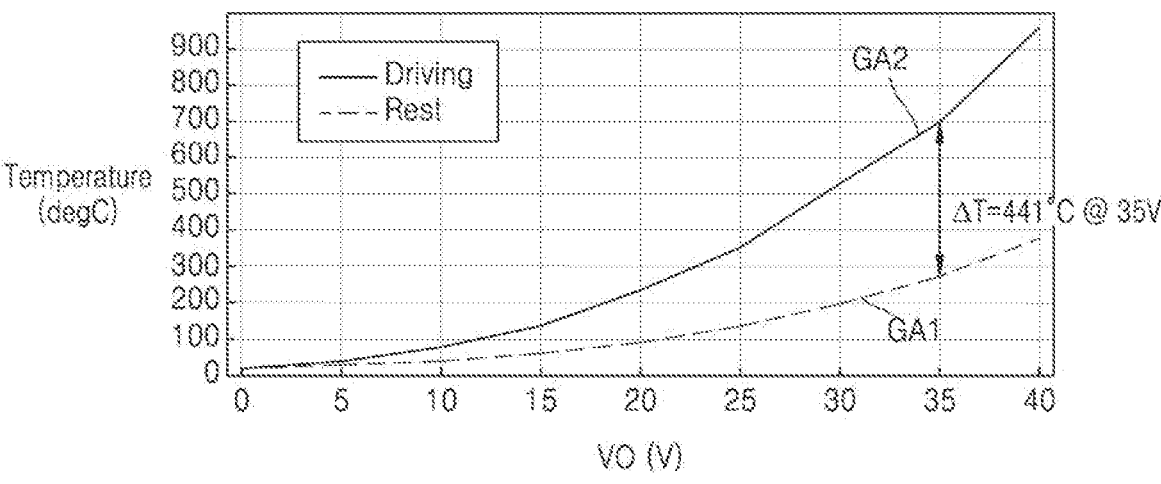
FIGS. 17A and 17B are graphs illustrating results of a simulation according to an example embodiment.
Figure 17B:
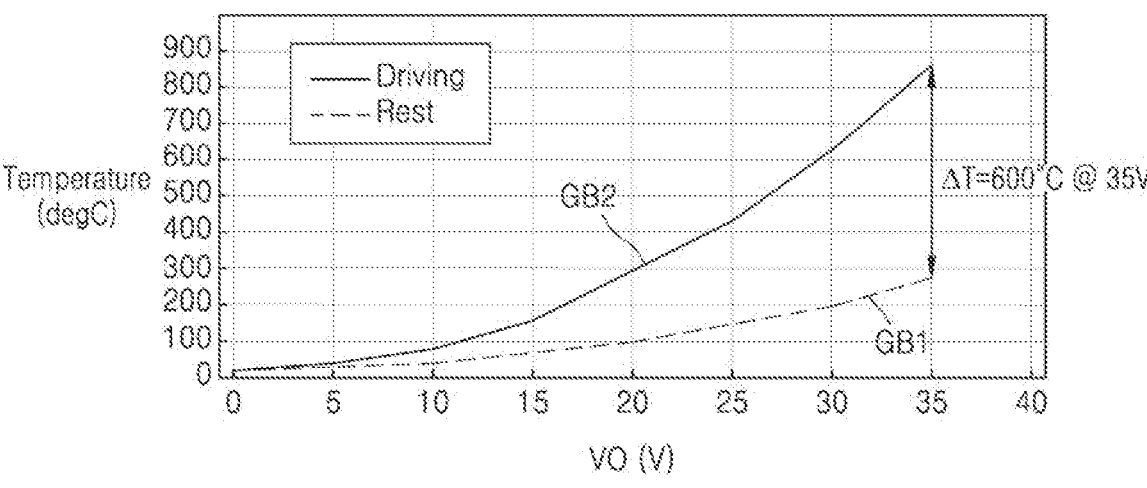

FIGS. 17A and 17B are graphs illustrating results of a simulation according to an example embodiment. FIGS. 17A and 17B illustrate results of a simulation performed to check an effect of providing holes in the blocking layer 215. In the present simulation, the first spatial light modulator 100 in which holes are formed in the blocking layer 215 is used, and a spatial light modulator (an existing spatial light modulator) in which holes are not formed in the blocking layer 215 is used as a control group. Each of the pixels 140 and 150 includes 18 HCGs instead of 7 HCGs, but one HCG at an edge is removed and a trench 160 is formed at a position thereof. As a result, each pixel is set to include 17 HCGs. Each HCG is set to be a polycrystalline silicon HCG. In addition, both the width W1 and the height H1 of each HCG are set to 450 nm, the period P1 is set to 560 nm, and the cavity layer 130 is set to a SiO2 layer, and a thickness thereof is set to 573 nm. In addition, the DBR layer 120 is set to include the first layer 120A and the second layer 120B that are alternately stacked three times, the first layer 120A is set to a silicon layer having a thickness of 118 nm, and the second layer 120B is set to a SiO2 layer having a thickness of 265 nm. The substrate 110 is set to be a silicon substrate. A width (a diameter) of the hole 12*h* formed in the blocking layer 215 is set to 0.5 µm and an interval thereof is set to 1 µm. The second operating method is used as an operating method. In other words, a current is set to be applied to all 17 HCGs set to be included in the second pixel 150.

FIG. 17A illustrates temperatures of a driving pixel and a non-driving pixel when the first operating method is applied to the existing spatial light modulator (the control group) that does not include holes, and FIG. 17B illustrates the temperatures of a driving pixel and a non-driving pixel when the first operating method is applied to the first spatial light modulator 100.

In FIGS. 17A and 17B, a horizontal axis represents voltage and a vertical axis represents temperature.

In FIG. 17A and FIG. 17B, first lines GA1 and GB1 represent the temperature of the non-driving pixel, and second lines GA2 and GB2 represent the temperature of the driving pixel.

Comparing FIG. 17A and FIG. 17B, both FIG. 17A and FIG. 17B illustrate that a temperature difference between the driving pixel and the non-driving pixel increases with an increase in an applied voltage, but the increase in the temperature difference illustrated in FIG. 17B is greater than the increase in the temperature difference illustrated in FIG. 17A. For example, when the applied voltage is 35 V, FIG. 17A illustrates that the temperature difference between the driving pixel and the non-driving pixel is about 441° C., whereas FIG. 17B illustrates that the temperature difference between the driving pixel and the non-driving pixel is about 600° C. and is much greater than the temperature difference illustrated in FIG. 17A.

The results show that holes are formed in the blocking layer 215 of the spatial light modulator, and thus, transfer of heat downward the driving pixel is appropriately suppressed. Therefore, when the same current is applied, the temperature of the driving pixel of the spatial light modulator having the holes formed therein is higher than the temperature of the driving pixel of the spatial light modulator not having the holes formed therein. As a result, the results of the simulation show that driving power of the spatial light modulator having the holes formed therein may be more lowered than driving power of the spatial light modulating not having the holes formed therein. In other words, the results of FIGS. 17A and 17B show that the spatial light modulator having holes formed in the blocking layer 215 may operate at low power.

Figure 18:
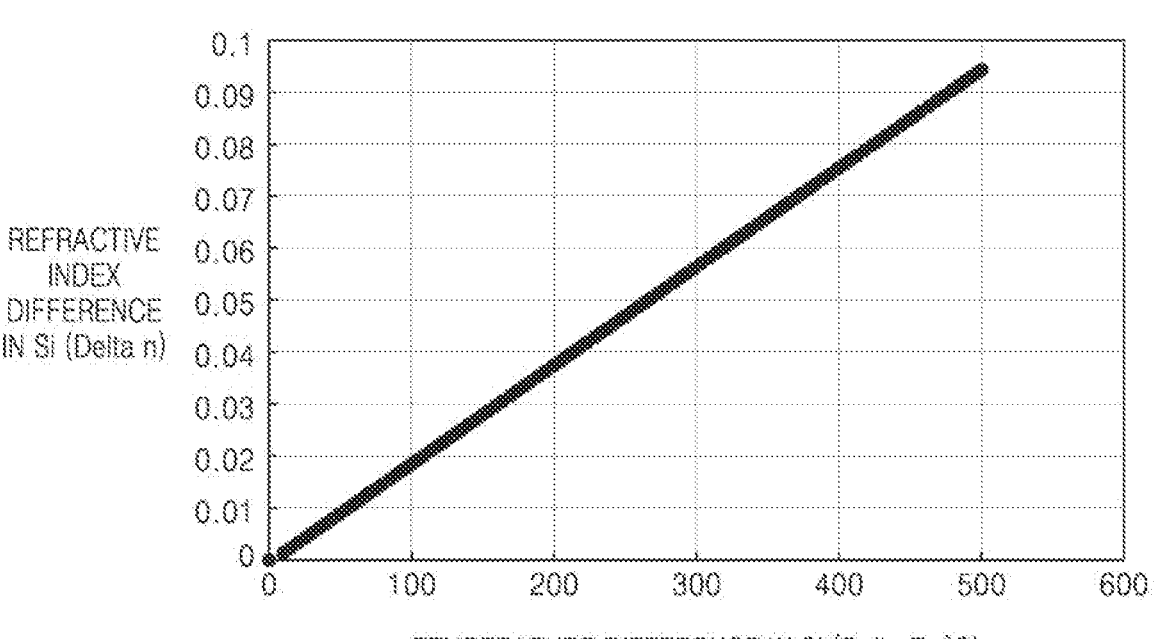
FIG. 18 is a graph illustrating a difference in a refractive index according to a difference in a temperature of silicon, in a spatial light modulator according to an example embodiment.

FIG. 18 is a graph illustrating a difference in a refractive index according to a difference in a temperature of silicon, in a spatial light modulator according to an example embodiment. FIG. 18 illustrates a refractive index difference between a driving pixel and a non-driving pixel, which include silicon, according to a temperature difference between the driving pixel and the non-driving pixel.

Referring to FIG. 18, the refractive index difference between the driving pixel and the non-driving pixel also increases in proportion to the temperature difference between the driving pixel and the non-driving pixel which include silicon.

As the refractive index difference between the driving pixel and the non-driving pixel is great, light incident on the spatial light modulator may be relatively easily and accurately steered.

Accordingly, FIGS. 17A, 17B, and 18 illustrate that, when the spatial light modulator having the holes formed in the blocking layer 215 is used, beam steering may be performed more easily and accurately than the spatial light modulator in which the holes are not formed.

Figure 19:
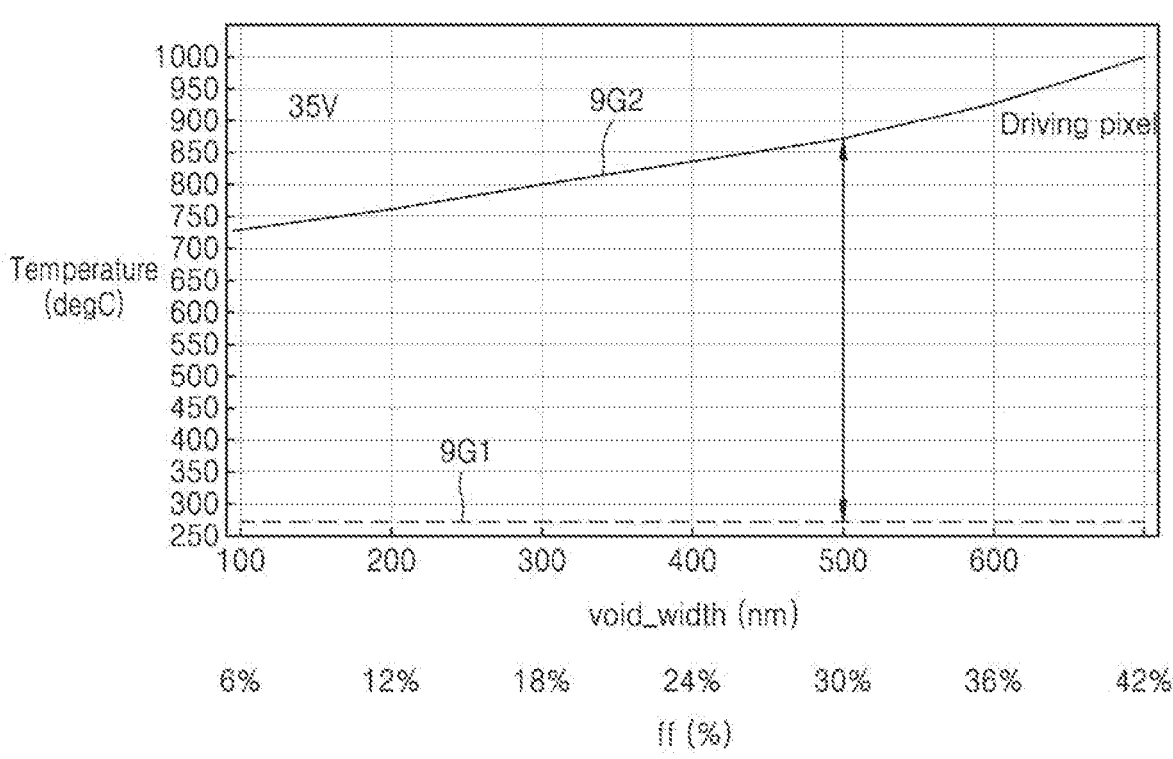
FIG. 19 is a graph illustrating a temperature of a driving pixel according to a fill factor of a hole included in a spatial light modulator according to an example embodiment.

FIG. 19 is a graph illustrating a temperature of a driving pixel according to a fill factor of a hole included in a spatial light modulator according to an example embodiment. FIG. 19 is a graph illustrating results of a simulation performed to check a relationship between a fill factor of a hole provided in the blocking layer 215 and a temperature difference between a driving pixel and a non-driving pixel. In the present simulation, the fill factor of the hole is increased by increasing a width of the hole. In FIG. 19, the widths (nm) (of the hole) 100, 200, 300, 400, 500, 600 and 700 correspond to the fill factor (%) of the hole 6, 12, 18, 24, 30, 36 and 42, respectively.

In addition, in the present simulation, a driving voltage applied to the driving pixel is set to about 35V.

In FIG. 19, a horizontal axis represents the width and fill factor of the hole side by side to correspond to each other, and a vertical axis represents the temperature.

In FIG. 19, a first line 9G1 represents a temperature of a non-driving pixel, and a second line 9G2 represents a temperature of a driving pixel.

Referring to FIG. 19, the temperature of the driving pixel also increases with an increase in the fill factor of the hole (an increase in the width of the hole). The result also shows that transfer of heat downward the driving pixel is suppressed by the hole, and a heat transfer suppression effect also increases with an increase in the fill factor of the hole. As a result, a low power operating effect of the spatial light modulator may be maximized by appropriately designing the fill factor of the hole.

The spatial light modulator according to the example embodiment described above may be one apparatus, or may be used as a component or device constituting another apparatus.

Accordingly, a spatial light modulator according to an example embodiment may be applied to apparatuses in various fields. For example, an illustrated spatial light modulator may be applied to a scanner constituting a time of flight (TOF) sensor for LiDAR, or may also be applied to a motion recognition sensor including a beam scanner, a depth sensor, an authentication sensor, and the like. In addition, when LiDAR is applied to mobile devices, power consumption and form factor may be additionally reduced, and thus, the illustrated spatial light modulator may be mounted on mobile and wearable devices that need ambient recognition.

Figure 20:
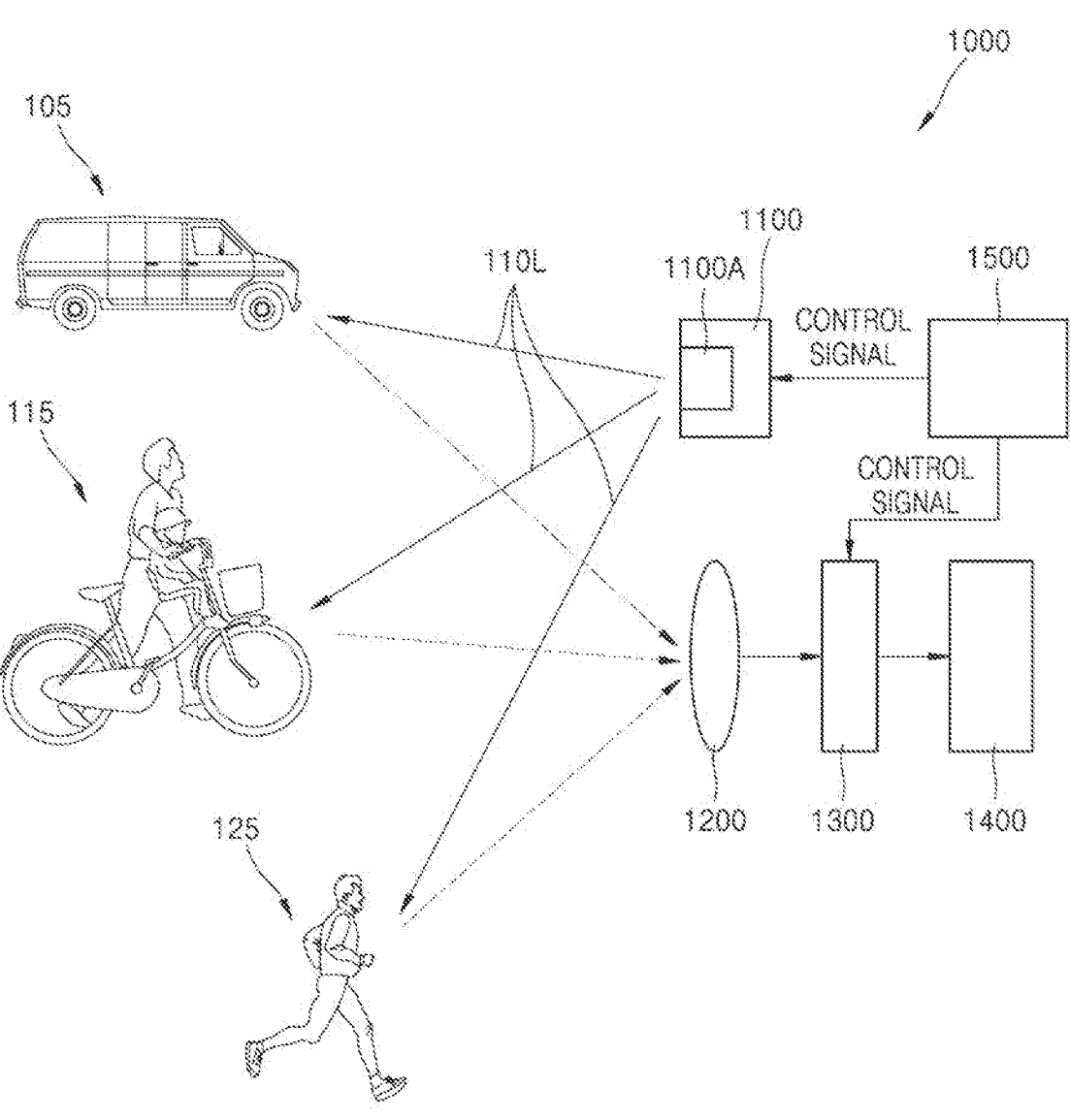
FIG. 20 is a diagram illustrating an apparatus including a spatial light modulator, according to an example embodiment.

FIG. 20 is a diagram illustrating an apparatus including a spatial light modulator, according to an example embodiment. FIG. 20 schematically illustrates a LiDAR system 1000 as an example of an apparatus having a spatial light modulator applied thereto, according to an example embodiment.

Referring to FIG. 20, the LiDAR system 1000 includes a light emitter 1100, a lens 1200, a light filter 1300, a detector 1400, and a controller 1500. When needing in a process to acquire information regarding first, second, and third subjects 105, 115, and 125 and in a process to process the acquired information, the LiDAR system 1000 may further include other components in addition to the above components. Light is emitted from the light emitter 1100 to the first, second, and third subjects 105, 115, and 125 to detect and recognize the first, second, and third subjects 105, 115, and 125.

The number and shape of the first, second, and third subjects 105, 115, and 125 are symbolic and do not have a limited significance. Various objects may be subjects, fixed or moving objects may also be subjects, and all objects, which may reflect light, may fall into the category of subjects.

Light 110L, which is emitted from the light emitter 1100 toward the first, second, and third subjects 105, 115, and 1125, may be light included in an infrared region, but is not limited thereto, and any light, which is generally recognized as not harmful to the human body, may be used.

The light emitter 1100 may include a light source module 1100A. The light source module 1100A may include a light source for generating light and an optical scanner provided to receive light emitted from the light source and radiate the light to the first, second, and third subjects 105, 115, and 125. The optical scanner may include one of spatial light modulators according to the example embodiments described above. The light source may be a light source capable of emitting light having various wavelengths (e.g., laser light) according to a given light emission signal. The light source may include, for example, a silicon photonics optical phased array (OPA) including a plurality of unit light sources (or cell light sources). A wavelength of the light 110L emitted from the light source module 1100A may be controlled by a control signal given from the controller 1500. The control signal may include a light emission signal. The light 110L emitted from the light source module 1100A is reflected from the first, second, and third subjects 105, 115, and 125 and is incident on the lens 1200.

The lens 1200 is illustrated as a single lens, but may be a lens optical system including a plurality of lenses to converge incident light to the light filter 1300. Light, which is incident on the lens 1200, is converged by the lens 1200 and incident on the light filter 1300.

The light filter 1300 may perform an operation of passing only light having a specific wavelength or light having a wavelength belonging to a particular band and blocking the remaining light. The light filter 1300 may be provided to actively perform an operation as described above. Accordingly, the light filter 1300 may include an active apparatus configured to pass only light having a particular wavelength as a central wavelength and block light having other wavelengths in response to a control signal given from the controller 1500. The control signal given to the light filter 1300 may include information regarding the central wavelength of the light to pass through the active apparatus, and the central wavelength may correspond to a central wavelength of light emitted from the light emitter 1100.

As a result, the control signal given to the light filter 1300 may include a control signal that matches the central wavelength of the light emitted from the light emitter 1100 with the central wavelength of the light to pass through the active apparatus of the light filter 1300. This control signal given from the controller 1500 to the light filter 1300 may be given in real time together with the control signal given from the controller 1500 to the light emitter 1100. Therefore, the control of the wavelength of the light 110L emitted from the light emitter 1100 and the control of the central wavelength of the light to pass through the active apparatus of the light filter 1300 may be performed in real time via the controller 1500. Accordingly, scanning of a scan region of the LiDAR system 1000, according to an example embodiment, including the first, second, and third subjects 105, 115, and 125 may be performed in real time.

Due to the active apparatus included in the light filter 1300, the light filter 1300 may selectively pass only desired light and block other noise light including natural light. Accordingly, a signal-to-noise ratio (SNR) of the LiDAR system 1000 may increase. As an example of the active apparatus, the optical filter unit 1300 may include a tunable band-pass filter. An operation method of the tunable band-pass filter may be a liquid crystal method or an acoustic-optic method.

The light passing through the light filter 1300 is incident on the detector 1400. The detector 1400 senses the light given from the light filter 1300, and acquires various types of information regarding the first, second, and third subjects 105, 115, and 125 on the basis of information included in the light. For example, the detector 1400 may detect time delay or phase difference information from incident light, and may acquire, on the basis of the detected time delay or phase difference information, information regarding distances to the first, second, and third subjects 105, 115, 125, location information of the first, second, and third subjects 105, 115, 125, depth images of the first, second, and third subjects 105, 115, 125, and the like. Accordingly, the detector 1400 may include a time-to-digital converter (TDC), an image sensor, and the like.

The controller 1500 may be arranged between the light emitter 1100 and the light filter 1300. The controller 1500 controls operations of the light emitter 1100 and the light filter 1300. The controller 1500 transmits a light emission start signal to the light emitter 1500 to emit light having a particular wavelength. In other words, the controller 1500 determines a wavelength of light to be emitted and transmits, to the light emitter 1100, a control signal including information regarding an electrical signal needed to emit light having the determined wavelength, so that the light having the determined wavelength is emitted from the light source module 1100A. The controller 1500 transmits the light emission start signal to the light emitter 1100 and also transmits a control signal to the light filter 1300 to control the light filter 1300 so that a light transmission central wavelength of the light filter 1300 becomes a wavelength of light emitted from the light emitter 1100.

FIGS. 21, 22, 23, 24, 25, 26, 27 and 28 are cross-sectional views illustrating a method of manufacturing a spatial light modulator, according to an example embodiment. A method of manufacturing a spatial light modulator, according to an example embodiment, will be described with reference to FIGS. 21 to 28. The same reference numbers as the reference numbers mentioned in the spatial light modulator according to the example embodiment described above denote the same elements, and the descriptions thereof will be omitted herein.

Figure 21:
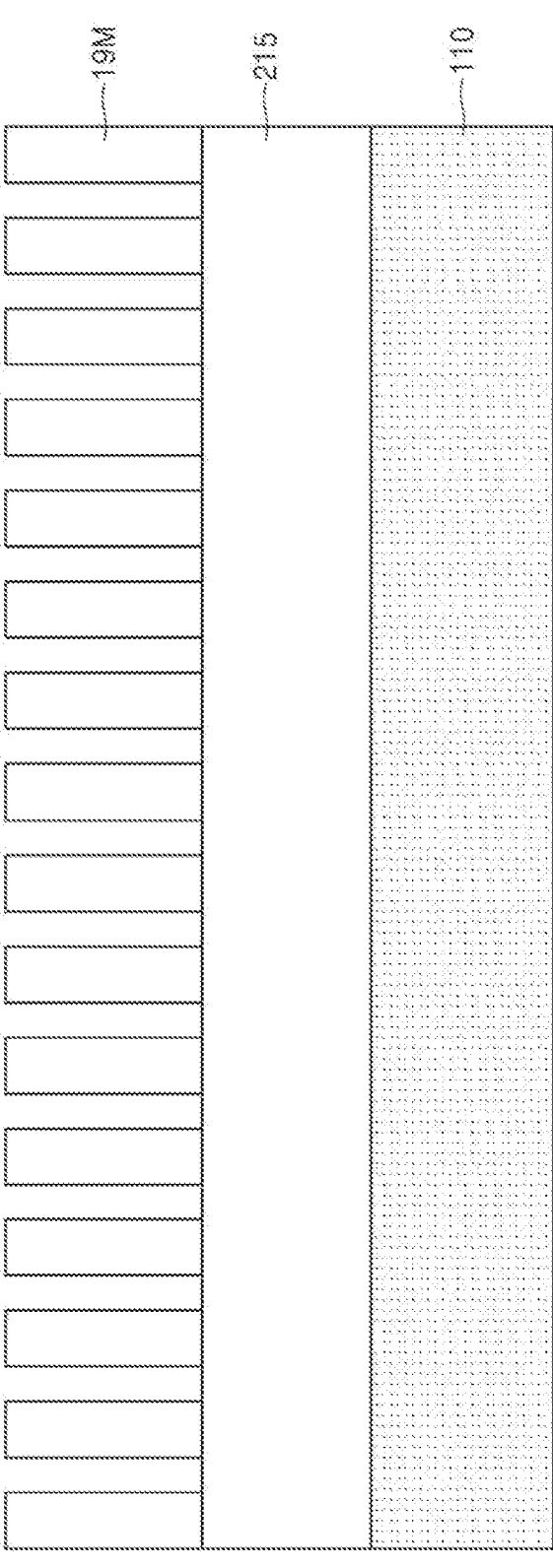

As illustrated in FIG. 21, a blocking layer 215 is formed on a substrate 110, and a mask pattern 19M is formed on the blocking layer 215. The mask pattern 19M may be a photosensitive film pattern, but is not limited thereto. The mask pattern 19M includes a pattern for forming a hole in the blocking layer 215. The pattern may be designed by considering the shapes and arrangement forms of the holes 12h, 14h, 22h, and 26h described with reference to FIGS. 1 to 12.

Subsequently, the blocking layer 215 may be etched using the mask pattern 19M as an etching mask, and the etching may be performed until the substrate 110 is exposed. The etching may include dry etching.

Figure 22:
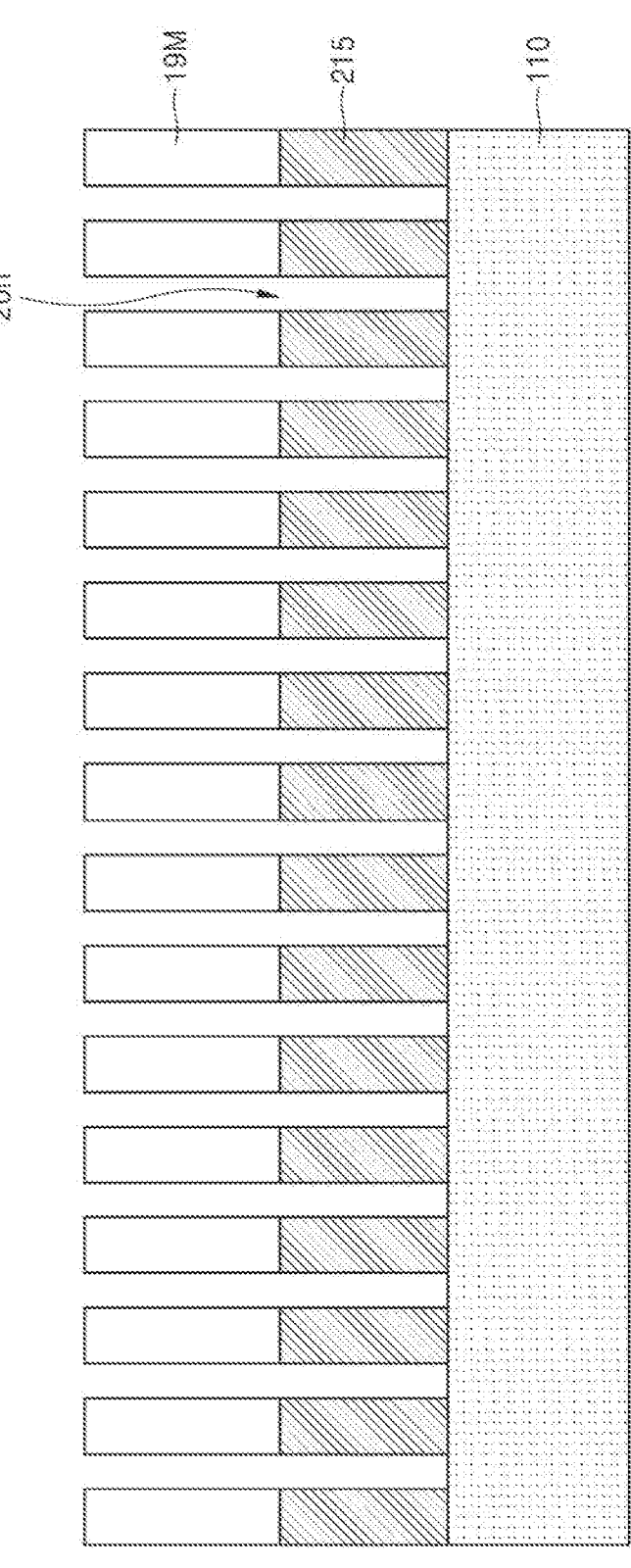

The blocking layer 215 around the mask pattern 19M is removed by the etching, and as illustrated in FIG. 22, a plurality of through-holes 20h are formed in the blocking layer 215. The through-holes 20h correspond to holes.

Figure 23:
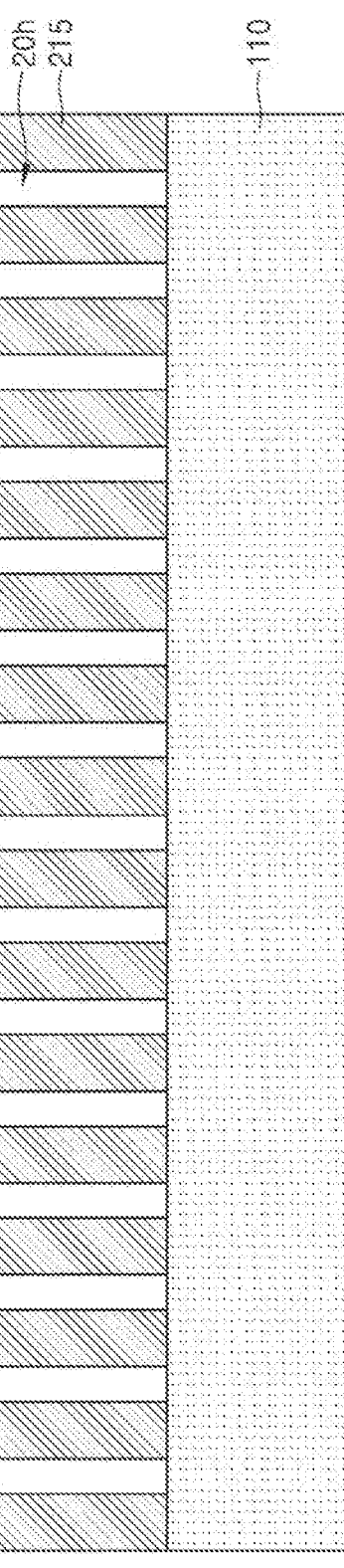

After the through-holes 20h are formed, the mask pattern 19M is removed. FIG. 23 illustrates a result of removing the mask pattern 19M.

Figure 24:
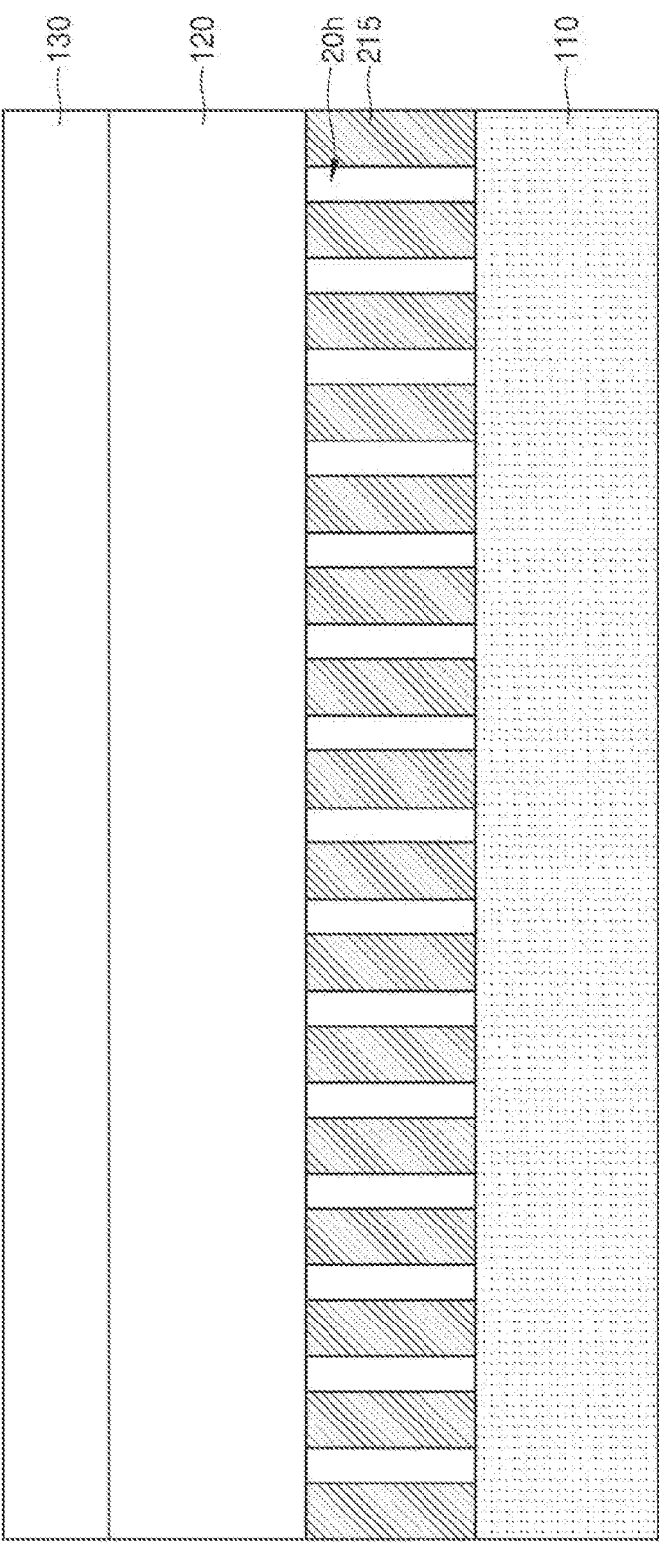

Subsequently, as illustrated in FIG. 24, a DBR layer 120 covering the plurality of through-holes 20h is formed on the blocking layer 215. For convenience of illustration, the DBR layer 120 is illustrated as a single layer.

In an example, instead of the DBR layer 120, a metal layer may be formed as a lower reflective layer or a lower mirror.

A cavity layer 130 is formed on the DBR layer 120.

Figure 25:
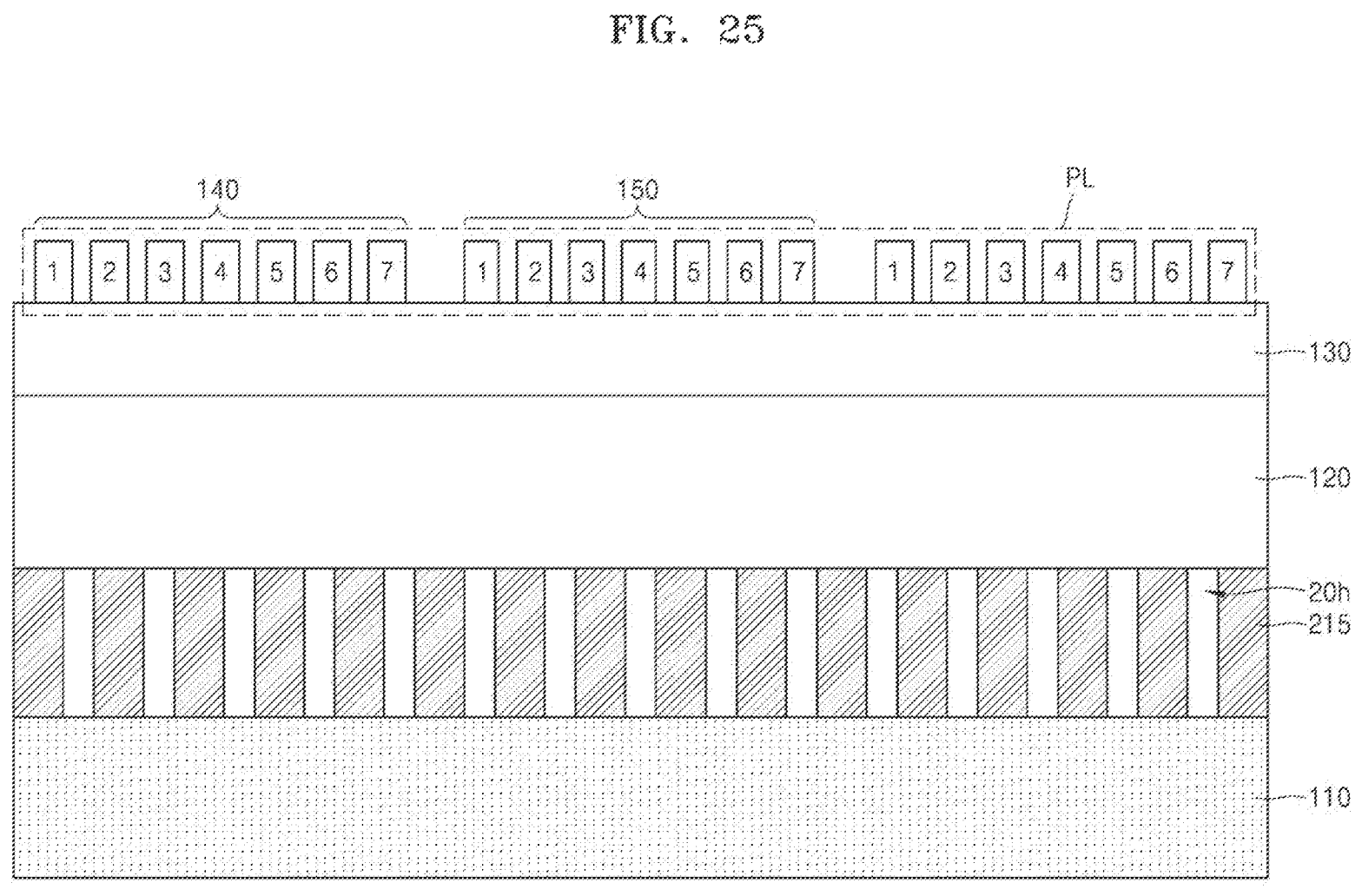

Subsequently, as illustrated in FIG. 25, a pixel layer PL is formed on a top surface of the cavity layer 130. The pixel layer PL includes a first pixel 140 and a second pixel 150 that are horizontally arranged. The pixel layer PL may include a plurality of first pixels 140 and a plurality of second pixels 150 that are repeatedly and alternately arranged. The first and second pixels 140 and 150 may be formed to be spaced apart from each other. Each of the first and second pixels 140 and 150 includes a plurality of active HCGs. However, the number of active HCGs included in each of the pixels 140 and 150 is not limited to seven, and each of the pixels 140 and 150 may include seven or less or seven or more active HCGs. The plurality of active HCGs may be the same as or substantially the same as each other in all aspects, such as shapes, structures, functions, and materials. The plurality of HCGs included in each of the pixels 140 and 150 are spaced apart from one another, and a separation width P1-W1 therebetween is less than a width W1 of each of the HCGs. Each of the plurality of HCGs included in each of the first and second pixels 140 and 150 may be electrically driven, and may be an active meta pattern. Accordingly, the pixel layer PL may be a meta surface or a meta surface layer including a plurality of active meta patterns.

The meta surface may be formed by depositing a meta material layer (e.g., a silicon layer) on the top surface of the cavity layer 130, and then patterning the deposited meta material layer. In an example, patterning of the deposited meta material layer may be performed by using a photolithographic etching process of a semiconductor manufacturing process, but is not limited thereto.

Figure 26:
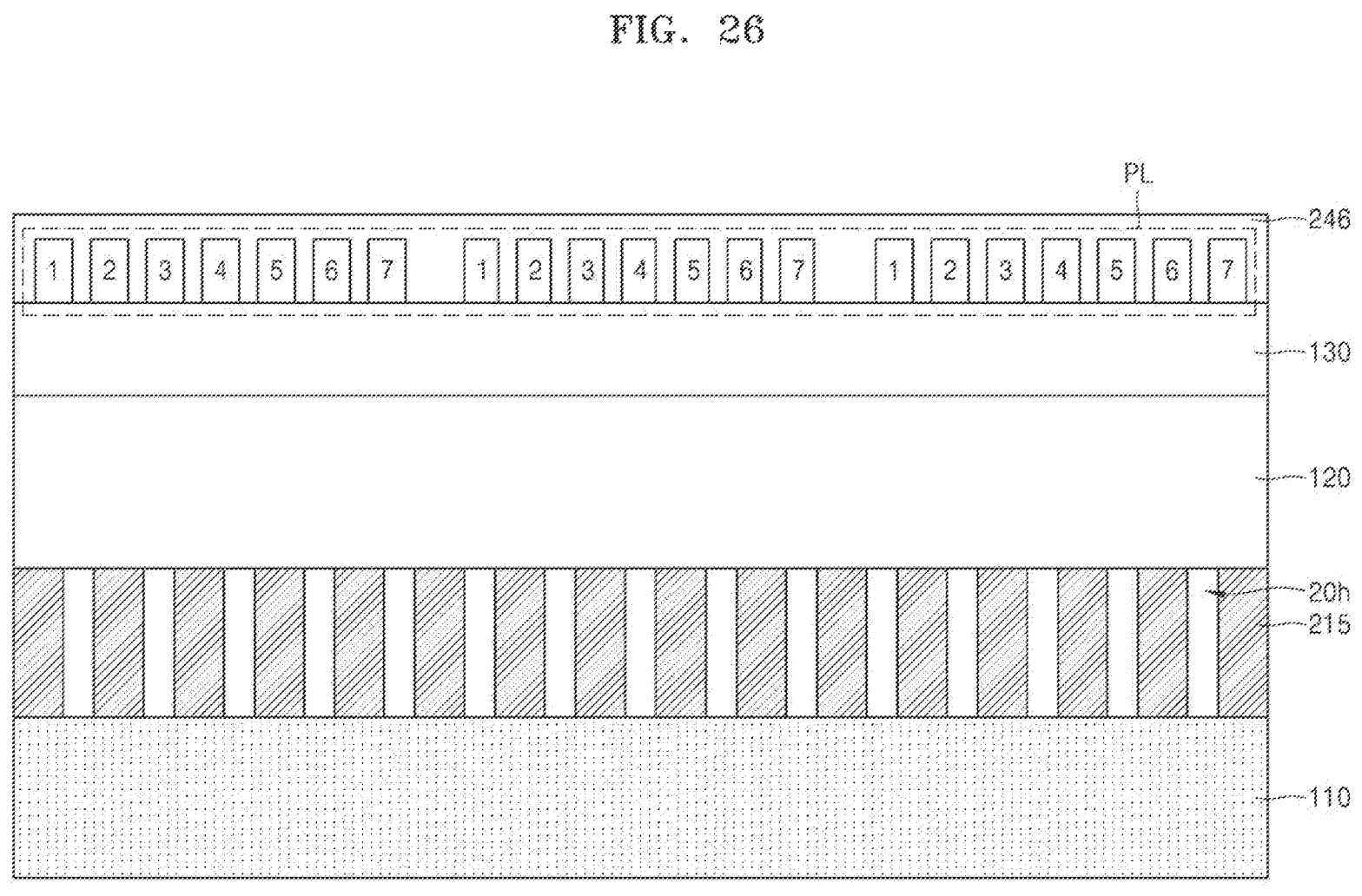

Subsequently, as illustrated in FIG. 26, a transparent material layer 246 covering the plurality of HCGs is formed on the cavity layer 130, and a top surface thereof is planarized. The entire surface of each of the HCGs may be fully covered with the transparent material layer 246. In an example, the transparent material layer 246 may include a silicon oxide layer.

By heat-treating the resultant structure having the transparent material layer 246 formed thereon, each of the HCGs may have a polycrystalline structure having various grain sizes or a polycrystalline structure having a columnar shape. In an example, the heat treatment may be performed at a high temperature higher than or equal to 750° C. for a time shorter than or equal to 10 minutes, or may be performed at a temperature of about 450° ° C. to about 650° C. for a time longer than or equal to 10 hours, and then may additionally be performed at a high temperature higher than or equal to 750° C. or higher to improve crystallinity.

In an example, after the heat treatment, SiO2 around each of the HCGs may be removed. A space between the respective HCGs may be filled with air or may be close to a vacuum state.

Figure 27:
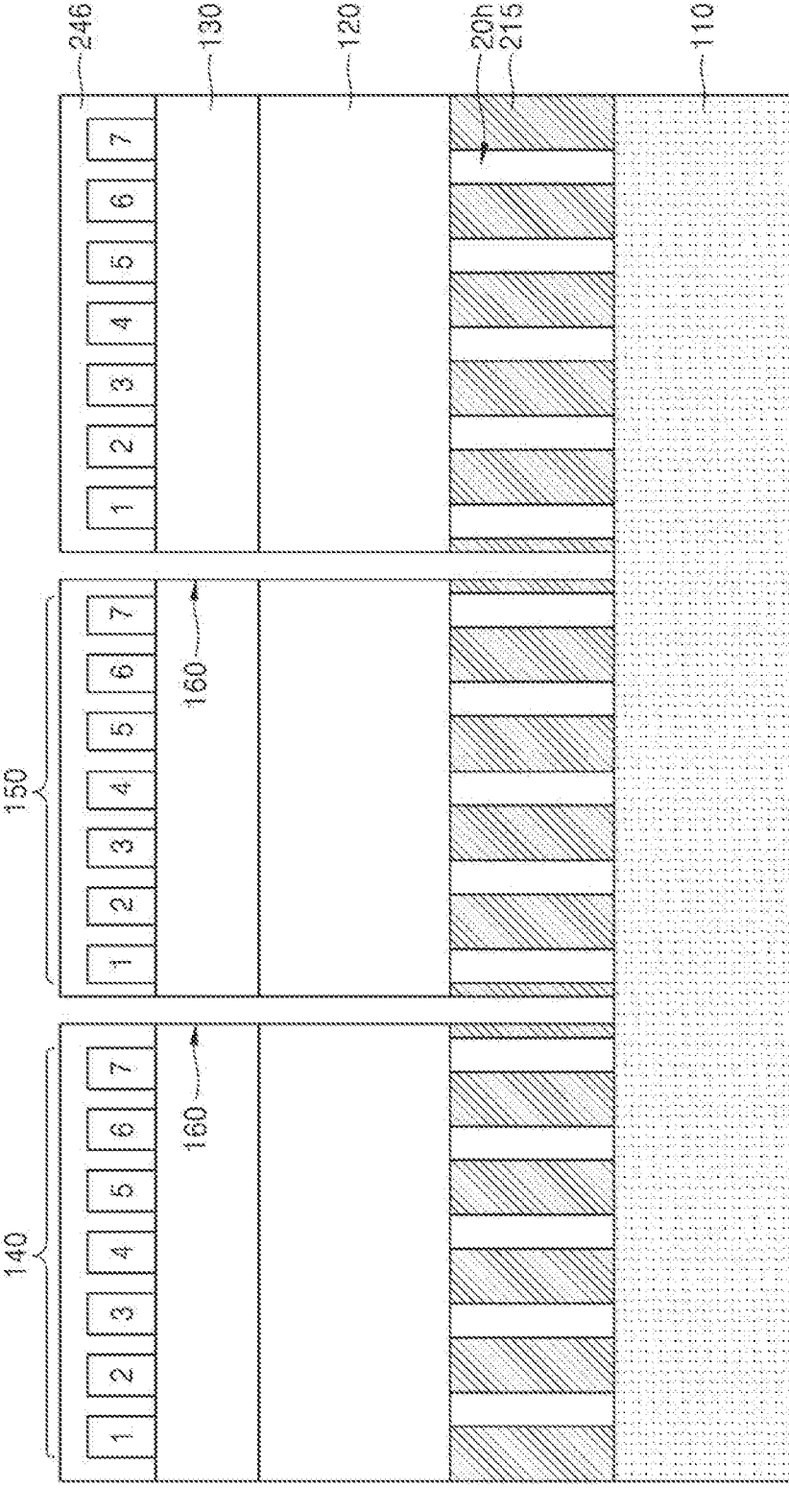

Subsequently, as illustrated in FIG. 27, a trench 160 through which one surface of the substrate 110 is exposed is formed between the first and second pixels 140 and 150. The trench 160 may be formed at a position spaced apart from the first and second pixels 140 and 150. The trench 160 may be spaced apart from the HCGs included in the first and second pixels 140 and 150. The trench 160 may be formed by sequentially etching the transparent material layer 246, the cavity layer 130, the DBR layer 120, and the blocking layer 215 while masking the first and second pixels 140 and 150. The etching may be performed until the one surface of the substrate 110 is exposed. The etching may be an appropriate method selected by considering a width and depth of the trench 160.

Accordingly, the first spatial light modulator 100 is formed. The manufacturing method described above may also be applied to methods of manufacturing other spatial light modulators described above.

Figure 28:
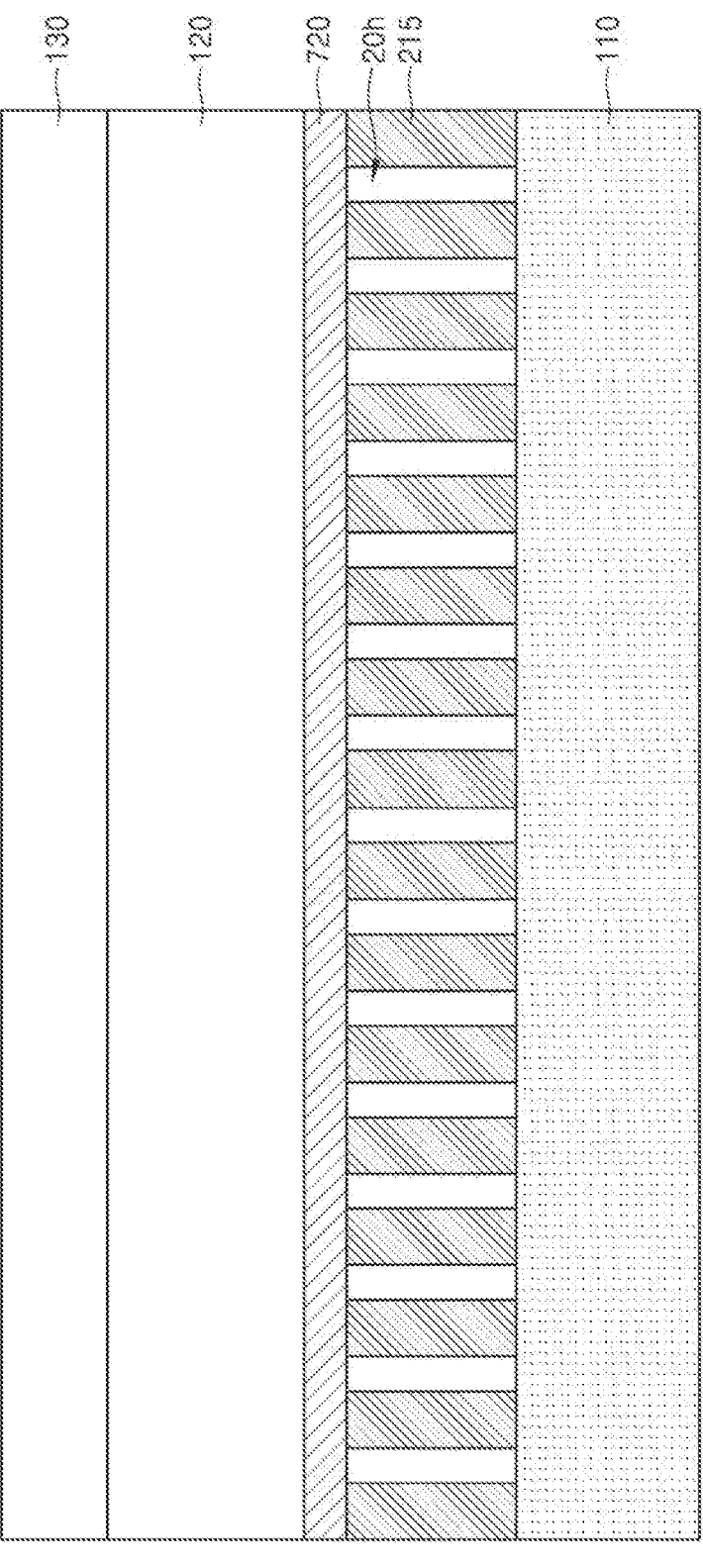

As illustrated in FIG. 28, in the manufacturing method, after forming the through-holes 20h that become holes, a planarization layer 720 may be formed before forming the DBR layer 120. In other words, the planarization layer 720 may be further formed between the blocking layer 215 having formed therein the through-holes 20h and the DBR layer 120. After the planarization layer 720 is formed, a surface thereof may be planarized by using a planarization apparatus (e.g., chemical mechanical polishing (CMP) apparatus). The planarization layer 720 may be or may not be formed by considering sizes of the through-hole 20h formed in the blocking layer 215 and/or distribution forms of the through-holes 20h.

In an example embodiment, in the etching operation for forming the through-holes 20h, only a portion of the blocking layer 215 may be etched within a range in which the substrate 110 is not exposed. In other words, instead of forming the through-holes 20h, trenches may be formed in the blocking layer 215. Entrances of the trenches may be naturally blocked in a subsequent material layer stacking process, and thus, holes 14h buried in the blocking layer 215 may be formed in the blocking layer 215 as illustrated in FIG. 4.

In an example embodiment, a metal mirror layer may be formed as a lower reflective layer, instead of the DBR layer 120.

A provided spatial light modulator includes, in a lateral direction, trenches between pixels, and includes, in a vertical direction, holes in a blocking layer provided between a substrate and a lower reflective layer (e.g., a DBR layer). Therefore, when the spatial light modulator operates, heat generated from a driving pixel may be suppressed from being transferred to a non-driving pixel in the lateral direction, and heat may also be suppressed from being transferred downwards. In other words, during driving, heat loss of the driving pixel in the lateral direction and the downward direction may be minimized. Accordingly, at the same operating current or the same power, the provided spatial light modulator may maintain a temperature difference between the driving pixel and the non-driving pixel relatively higher than a spatial light modulator not including holes. Therefore, when the provided spatial light modulator is used, driving power may be lowered. In other words, even at lower power than the spatial light modulator not including the holes, the provided spatial light modulator may exhibit effects that are equivalent to or greater than those of the spatial light modulator not including the holes.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spatial light modulator comprising:
a substrate;
a blocking layer provided on one surface of the substrate;
a lower reflective layer provided on the blocking layer;
an upper reflective layer facing the lower reflective layer; and
a cavity layer provided between the upper reflective layer and the lower reflective layer,
wherein the blocking layer comprises a plurality of holes configured to block heat transferred from the upper reflective layer to the substrate, and
wherein the plurality of holes are at least partially filled with a material having a thermal conductivity that is lower than a thermal conductivity of a material of the blocking layer and that is higher than a thermal conductivity of air.

2. The spatial light modulator of claim 1, further comprising a planarization layer provided between the blocking layer and the lower reflective layer.

3. The spatial light modulator of claim 1, wherein the plurality of holes are provided under a top surface of the blocking layer.

4. The spatial light modulator of claim 1, wherein the plurality of holes are of a circular shape.

5. The spatial light modulator of claim 4, wherein a first hole of the plurality of holes has a first diameter, and
wherein a second hole of the plurality of holes that is adjacent to the first hole has a second diameter different from the first diameter.

6. The spatial light modulator of claim 1, wherein the plurality of holes are of a quadrangular shape.

7. The spatial light modulator of claim 6, wherein a first hole of the plurality of holes has a first width, and
wherein a second hole of the plurality of holes that is adjacent to the first hole has a second width different from the first width.

8. The spatial light modulator of claim 1, wherein the plurality of holes have diameters varying between top ends of the plurality of holes and bottom ends of the plurality of holes.

9. The spatial light modulator of claim 8, wherein the plurality of holes have maximum diameters between the top ends of the plurality of holes and the bottom ends of the plurality of holes.

10. The spatial light modulator of claim 1, wherein the plurality of holes comprise:

a first hole having a first diameter; and
a second hole having a second diameter different from the first diameter.

11. The spatial light modulator of claim 1, wherein a fill factor of the plurality of holes in the blocking layer is between 5% to 70%.

12. The spatial light modulator of claim 1, wherein the thermal conductivity of the material with which the plurality of holes is filled is lower than a thermal conductivity of $SiO_2$.

13. The spatial light modulator of claim 1, wherein the material with which the plurality of holes is filled comprises at least one of $HfO_2$, $MoS_2$, polyimide, $Sb_2S_3$, and $Sb_2Se_3$.

14. The spatial light modulator of claim 1, wherein the plurality of holes are at least partially filled with air.

15. The spatial light modulator of claim 1, wherein the upper reflective layer comprises a plurality of pixels spaced apart from each other, and wherein each of the plurality of pixels comprises a plurality of active meta patterns.

16. The spatial light modulator of claim 15, further comprising trenches provided between the plurality of pixels and configured to pass through the cavity layer, the lower reflective layer, and the blocking layer.

17. The spatial light modulator of claim 15, wherein each of the plurality of active meta patterns comprises a first layer, a second layer, and a third layer that are sequentially stacked,
wherein the first layer comprises one of a P-type dopant and an N-type dopant,
wherein the third layer comprises one of a P-type dopant and an N-type dopant, and
wherein the second layer is thicker than the first layer and the third layer.

18. The spatial light modulator of claim 1, wherein the lower reflective layer comprises a distributed Bragg reflector (DBR) layer,
wherein the DBR layer comprises:
a plurality of first layers comprising a first thermal conductivity; and
a plurality of second layers comprising a second thermal conductivity that is higher than the first thermal conductivity, and
wherein the plurality of first layers and the plurality of second layers are alternately stacked.

19. An electronic apparatus comprising:
a spatial light modulator configured to radiate incident light in a given direction,
wherein the spatial light modulator comprises the spatial light modulator of claim 1.

* * * * *